US006166314A

United States Patent [19]

Weinstock et al.

[11] Patent Number: 6,166,314

[45] Date of Patent: Dec. 26, 2000

[54] METHOD AND APPARATUS FOR REAL-TIME CORRELATION OF A PERFORMANCE TO A MUSICAL SCORE

[75] Inventors: Frank M. Weinstock, Cincinnati, Ohio; George F. Litterst, Newton Centre, Mass.

[73] Assignee: Time Warp Technologies, Ltd., Newton Centre, Mass.

[21] Appl. No.: 09/015,004

[22] Filed: Jan. 28, 1998

Related U.S. Application Data

[63] Continuation-in-part of application No. 08/878,638, Jun. 19, 1997, Pat. No. 5,952,597.

[51] Int. Cl.[7] ............................ G09B 15/00; G09B 15/02

[52] U.S. Cl. ..................... 84/483.1; 84/477 R; 84/483.2; 84/484; 84/609

[58] Field of Search ..................... 84/601–602, 609–614, 84/615–618, 634–637, 649–656, 477 R, 483.1, 483.2, 484, DIG. 6

[56] References Cited

U.S. PATENT DOCUMENTS

| | | | |
|---|---|---|---|
| 3,243,494 | 3/1966 | Park | 84/714 |
| 3,255,292 | 6/1966 | Park | 84/713 |
| 3,383,452 | 5/1968 | Park et al. | 48/713 |
| 3,522,358 | 7/1970 | Campbell | 84/713 |
| 3,553,334 | 1/1971 | Freeman | 84/668 |
| 3,629,482 | 12/1971 | Pulfer et al. | 84/667 |
| 3,787,601 | 1/1974 | Campbell | 84/713 |
| 3,840,691 | 10/1974 | Okamoto | 84/667 |
| 3,915,047 | 10/1975 | Davis et al. | 84/635 |
| 3,926,088 | 12/1975 | Davis et al. | 84/462 |
| 4,341,140 | 7/1982 | Ishida | 84/711 |
| 4,345,501 | 8/1982 | Nakada et al. | 84/612 |
| 4,402,244 | 9/1983 | Nakada et al. | 48/612 |
| 4,432,266 | 2/1984 | Nakada | 84/612 |
| 4,471,163 | 9/1984 | Donald et al. | 178/22.08 |
| 4,476,764 | 10/1984 | Nishimoto | 84/668 |

(List continued on next page.)

FOREIGN PATENT DOCUMENTS 0488732 11/1991 European Pat. Off. .

OTHER PUBLICATIONS

Allen et al., "Tracking Musical Beats in Real Time", *International Computer Music Association*, pp. 140–143, (1990).

Bloch et al., "Real–Time Computer Accompaniment of Keyboard Performances", *Proceedings of the 1985 International Computer Music Conf.*, pp. 279–290 (1985).

Capell et al., "Instructional Design and Intelligent Tutoring: Theory and the Precision of Design", *Jl. of Artificial Intell. in Educ.*, vol.: 4(1), pp. 95–121 (1993).

Dannenberg, "The Computer as Accompanist", *CHI'86 Proceedings*, pp. 41–43, (Apr. 1986).

Dannenberg, "Music Representation Issues, Techniques, and Systems", *Computer Music Journal*, vol.: 17(3), pp. 20–30 (1993).

Dannenberg, "Results from the Piano Tutor Project", The Fourth Biennial Arts & Technology Symposium, the Center for Arts & Tech. at CT College, pp. 143–150 (Mar.4–7, 1993).

(List continued on next page.)

*Primary Examiner*—David Martin
*Assistant Examiner*—Marlon T. Fletcher
*Attorney, Agent, or Firm*—Testa, Hurwitz & Thibeault, LLP.

[57] ABSTRACT

The invention relates to a computerized method for correlating a performance, in real time, to a score of music, and a machine based on that method. A score processor accepts a score which a user would like to play and converts it into a useable format. Performance input data is accepted by the input processor and the performance input data is correlated to the score on a note-by-note basis. An apparatus for performing this method includes an input processor that receives input and compares it to the expected score to determine whether an entire chord has been matched, and an output processor which receives a note match signal from the input processor and provides an output stream responsive to the match signals.

7 Claims, 29 Drawing Sheets

U.S. PATENT DOCUMENTS

| | | | |
|---|---|---|---|
| 4,484,507 | 11/1984 | Nakada et al. | 84/612 |
| 4,562,306 | 12/1985 | Chou et al. | 178/22.08 |
| 4,593,353 | 6/1986 | Pickholtz | 364/200 |
| 4,602,544 | 7/1986 | Yamada et al. | 84/1.01 |
| 4,621,321 | 11/1986 | Boebert et al. | 364/200 |
| 4,630,518 | 12/1986 | Usami | 84/1.03 |
| 4,651,612 | 3/1987 | Matsumoto | 84/1.03 |
| 4,685,055 | 8/1987 | Thomas | 364/200 |
| 4,688,169 | 8/1987 | Joshi | 364/200 |
| 4,740,890 | 4/1988 | William | 364/200 |
| 4,745,836 | 5/1988 | Dannenberg | 84/1.03 |
| 5,034,980 | 7/1991 | Kubota | 380/4 |
| 5,056,009 | 10/1991 | Mizuta | 364/200 |
| 5,113,518 | 5/1992 | Durst, Jr. et al. | 395/550 |
| 5,131,091 | 7/1992 | Mizuta | 395/725 |
| 5,227,574 | 7/1993 | Mukaino | 84/652 |
| 5,315,911 | 5/1994 | Ochi | 84/477 R |
| 5,347,083 | 9/1994 | Suzuki et al. | 84/613 |
| 5,455,378 | 10/1995 | Paulson et al. | 84/610 |
| 5,491,751 | 2/1996 | Paulson et al. | 380/25 |
| 5,521,323 | 5/1996 | Paulson et al. | 84/610 |
| 5,521,324 | 5/1996 | Dannenberg et al. | 84/612 |
| 5,585,585 | 12/1996 | Paulson et al. | 84/610 |
| 5,629,491 | 5/1997 | Usa | 84/636 |
| 5,693,903 | 12/1997 | Heidorn et al. | 84/668 |
| 5,792,972 | 8/1998 | Houston | 84/645 |
| 5,913,259 | 6/1999 | Grubb et al. | 84/610 |
| 5,952,597 | 9/1999 | Weinstock et al. | 84/609 |

OTHER PUBLICATIONS

Dannenberg, "Software Support for Interactive Multimedia Performance", *Interface*, vol.: 22, pp. 213–228 (1993).

Dannenberg, "Human–Computer Interaction in the Piano Tutor", *Multimedia Interface Design*, pp. 65–78 (1992).

Dannenberg, "Practical Aspects of a Midi Conducting Program", *Proceedings of the 1991 Int'l Computer Music Conf., Computer Music Assoc.*, pp. 537–540 (1991).

Dannenberg, "Software Support for Interactive Multimedia Performance", *Proceedings the Arts and Technology, The Center for Art & Tech. at CT College*, pp. 148–156 (1991).

Dannenberg, "Real–Time Computer Accompaniment", *Handout at Acoustical Society of America*, pp. 1–10 (May 1990).

Dannenberg, "An Expert System for Teaching Piano to Novices", *International Computer Music Assoc.*, pp. 20–23 (1990).

Dannenberg, "Recent Work in Real–Time Music Understanding by Computer", *Music, Language, Speech and Brain, Wenner–Gren Int'l Symposium Series*, vol.: 59, pp. 194–202 (1990).

Dannenberg, "Real Time Control for Interactive Computer Music and Animation", The Arts & Tech. II: A Symposium, CT College, pp. 85–95 (1989).

Dannenberg, "Real–Time Scheduling and Computer Accompaniment", *Current Directions in Computer Music Research*, edited by Max. V. Matthews & John R. Pierce, MIT Press, Camb., MA, pp. 225–261 (1989).

Dannenberg, "New Techniques for Enhanced Quality of Computer Accompaniment", *ICMC Proceedings*, pp. 242–249 (1988).

Dannenberg, "Following an Improvisation in Real Time", *ICMC Proceedings*, pp. 241–248 (1987).

Dannenberg, "An On–Line Algorithm for Real–Time Accompaniment", *ICMC '84 Proceedings*, pp. 193–198 (1985).

Grubb et al., "Automated Accompaniment of Musical Ensembles", *Proceedings of the 12th Nat'l Conf. on Artificial Intel*, pp. 94–99 (1994).

Lifton et al., "Some Technical and Aesthetic Considerations in Software for Live Interactive Performance", *ICMC '85 Proceedings*, pp. 303–306 (1985).

McKee, "Vivace", *Bandworld, The Int'l Band Magazine*, (Oct.–Dec., 1989).

"Music to Your Ears", *Rolling Stone*, (Dec. 1, 1994).

Puckette et al., *ICMC Proceedings*, ICMA pub. pp. 182–185 (1992).

Vercoe, "The Synthetic Performer in the Context of Live Performance", *ICMC '84 Proceedings*, pp. 199–200 (1985).

Vercoe et al., "Synthetic Rehearsal: Training the Synthetic Performer", *ICMC '85 Proceedings*, pp. 275–289 (1985).

Weinstock, "Demonstration of Concerto Accompanist, a Program for the Macintosh Computer", pp. 1–3 (Sep. 1993).

"Welcome to the Vivace Room", *Musical Merchandise Review*, pp. 124–127 (Jan. 1995).

Cavaliere et al., "From Computer Music to the Theater: The Realization of a Theatrical Automaton", *Computer Music Journal*, vol.: 6(4) (Winter 1982).

Kowalski et al., "The N.Y.I.T. Digital Sound Editor", *Computer Music Journal*, vol.: 6(1) (Spring 1982).

Roads, "A Report of SPIRE: An Interactive Audio Processing Environment", *Computer Music Journal*, vol.: 7(2) (Summer 1983).

METHOD AND APPARATUS FOR REAL-TIME CORRELATION OF A PERFORMANCE TO A MUSICAL SCORE

CROSS-REFERENCE TO RELATED APPLICATION

This application is a continuation-in-part of patent application Ser. No. 08/878,638, filed Jun. 19, 1997, now U.S. Pat. No. 5,952,597 the contents of which are incorporated herein by reference.

A portion of the disclosure of this patent document contains material which is subject to copyright protection. The copyright owner has no objection to the facsimile, reproduction by anyone of the patent disclosure, as it appears in the Patent and Trademark Office patent and files or records, but otherwise reserves all copyright rights whatsoever.

FIELD OF THE INVENTION

The invention involves real-time tracking of a performance in relation to a musical score and, more specifically, using computer software, firmware, or hardware to effect such tracking.

BACKGROUND OF THE INVENTION

Machine-based, i.e. automated, systems capable of tracking musical scores cannot "listen" and react to musical performance deviations in the same way as a human musician. A trained human musician listening to a musical performance can follow a corresponding musical score to determine, at any instant, the performance location in the score, the tempo (speed) of the performance, and the volume level of the performance. The musician uses this information for many purposes, e.g., to perform a synchronized accompaniment of the performance, to turn pages for the performer, or to comment on the performance.

However, it is often difficult to practice a musical piece requiring the participation of a number of different musical artists. For example, a pianist practicing a piano concerto may find it difficult to arrange to have even a minimal number of musical artists available whenever he or she desires to practice. Although the musical artist could play along with a prerecorded arrangement of the musical piece, the artist may find it difficult to keep up with the required tempo while learning the piece. Also, the performer is restrained from deviating, from the prerecorded arrangement, for expressive purposes. For example, if the performer changes tempo or volume, the prerecorded arrangement does not vary in speed or volume to match the performance. Further, it is often tedious to search an entire prerecorded piece of music for the particular segment of the work requiring practice.

Accordingly, there is a need for an automated system which can track a musical score in the same manner, i.e. correlating an input performance event with a particular location in an associated musical score. This allows a musician to perform a particular musical piece while the system: (i) provides a coordinated audio accompaniment; (ii) changes the musical expression of the musician's piece, or of the accompaniment, at predetermined points in the musical score; (iii) provides a nonaudio accompaniment to the musician's performance, such as automatically displaying the score to the performer; (iv) changes the manner in which a coordinated accompaniment proceeds in response to input; (v) produces a real-time analysis of the musician's performance; or (vi) corrects the musician's performance before the notes of the performance become audible to the listener.

SUMMARY OF THE INVENTION

It is an object of this invention to automate the score tracking process described above, making the information available for whatever purpose is desired—such as an automatic performance of a synchronized accompaniment or a real-time analysis of the performance.

A comparison between a performance input event and a score of the piece being performed is repeatedly performed, and the comparisons are used to effect the tracking process. Performance input may deviate from the score in terms of the performance events that occur, the timing of those events, and the volume at which the events occur; thus simply waiting for events to occur in the proper order and at the proper tempo, or assuming that such events always occur at the same volume, does not suffice. In the case of a keyboard performance, for example, although the notes of a multi-note chord appear in the score simultaneously, in the performance they will occur one after the other and in any order (although the human musician may well hear them as being substantially simultaneous). The performer may omit notes from the score, add notes to the score, substitute incorrect notes for notes in the score, play notes more loudly or softly than expected, or jump from one part of the piece to another; these deviations should be recognized as soon as possible. It is, therefore, a further object of this invention to correlate a performance input to a score in a robust manner such that minor errors can be overlooked, if so desired.

Another way performance input may deviate from a score occurs when a score contains a sequence of fairly quick notes, e.g., sixteenth notes, such as a run of CDEFG. The performer may play C and D as expected, but slip and play E and F virtually simultaneously. A human would not jump to the conclusion that the performer has suddenly decided to play at a much faster tempo. On the other hand, if the E was just somewhat earlier than expected, it might very well signify a changing tempo; but if the subsequent F was then later than expected, a human listener would likely arrive at the conclusion that the early E and the late F were the result of uneven finger-work on the part of the performer, not the result of a musical decision to play faster or slower.

A human musician performing an accompaniment containing a sequence of fairly quick notes matching a similar sequence of quick notes in another musician's performance would not want to be perfectly synchronized with an uneven performance. The resultant accompaniment would sound quirky and mechanical. However, the accompaniment generally needs to be synchronized with the performance.

Also, a performer might, before beginning a piece, ask the accompanist to wait an extra long time before playing a certain chord; there is no way the accompanist could have known this without being told so beforehand. It is still a further object of this invention to provide this kind of accompaniment flexibility by allowing the performer to "mark the score," i.e., to specify special actions for certain notes or chords, such as waiting for the performer to play a particular chord, suspending accompaniment during improvisation, restoring the tempo after a significant tempo change, ignoring the performer for a period of time, defining points to which the accompaniment is allowed to jump, or other actions.

In one aspect, the present invention relates to a method for real time tracking of a musical performance in relation to a score of the performance piece. Each note of the musical performance is received as it occurs. A range of the score in which the note is expected to occur is determined for every received note. Whether or not the received note occurs in the determined range of the score it is determined for every received note. A coordinated accompaniment is provided if the received note, in fact, occurs in the determined range of the score. Information is displayed associated with the coordinated accompaniment.

In another aspect, the present invention relates to an apparatus for real time tracking of a musical performance in relation to a score of the performed piece. The apparatus comprises an input processor, an output manager, and an output device. The input processor receives each note of a performance input as it occurs, stores each received note and information associated with each received note in a memory element, and compares each received note to the score of the performed piece to determine if the received note matches the score. The output manager receives a signal from the input processor and provides an output stream responsive to the received signal. The output device displays information associated with the output stream and receives information affecting the provision of the output stream.

BRIEF DESCRIPTION OF THE DRAWINGS

The invention is pointed out with particularity in the appended claims. The advantages of this invention described above, as well as further advantages of this invention, may be better understood by reference to the following description taken in conjunction with the accompanying drawings, in which:

DETAILED DESCRIPTION OF THE INVENTION

General Concepts

Figure 1A:
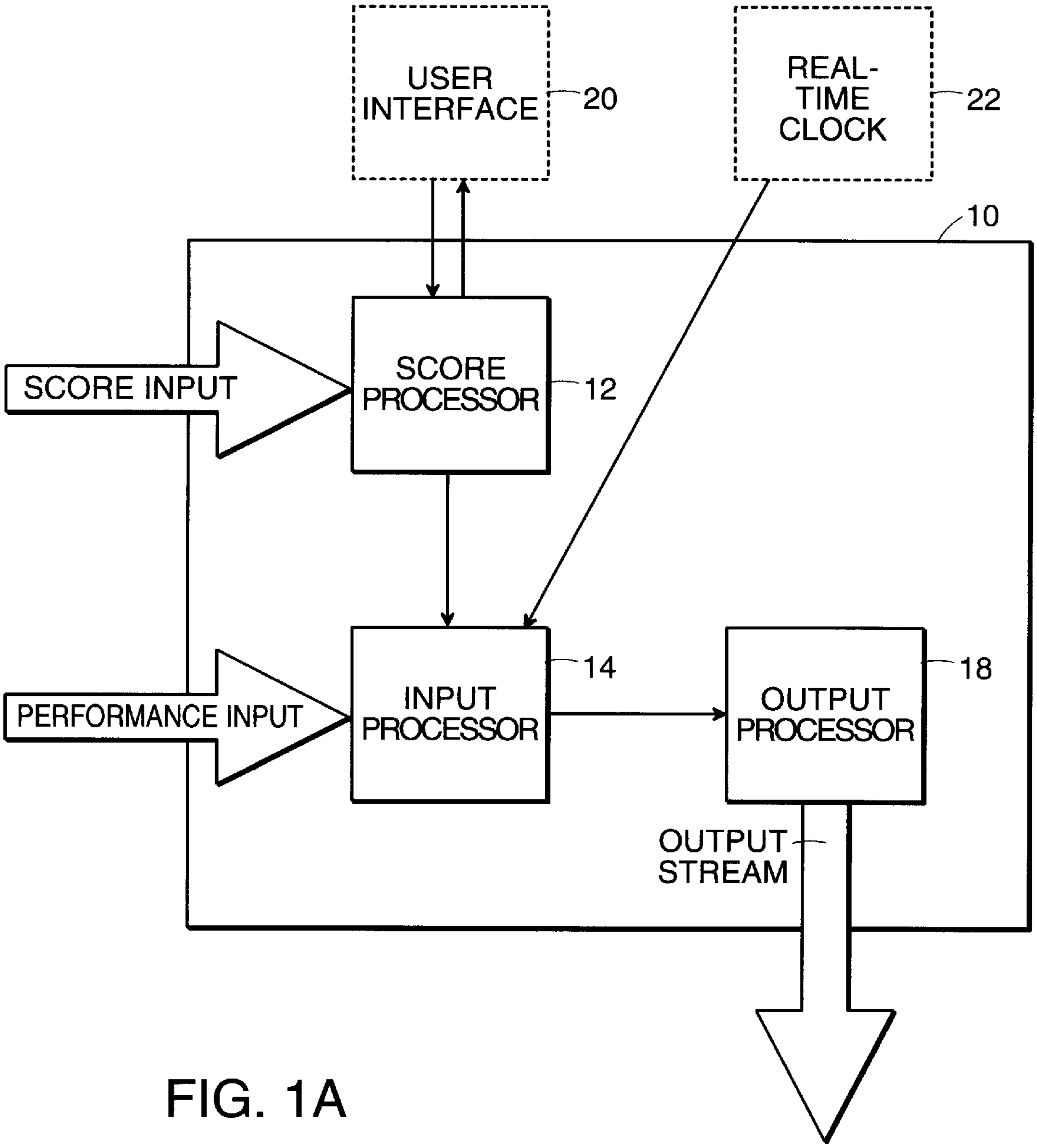
FIG. 1A is a functional block diagram of an embodiment of an apparatus for correlating a performance to a score.

Before proceeding with a detailed discussion of the machine's operation, the concepts of time and tempo should be discussed. There are essentially two time streams maintained by the machine, called RealTime and MusicTime, both available in units small enough to be musically insignificant (such as milliseconds). RealTime measures the passage of time in the external world; it would likely be set to 0 when the machine first starts, but all that matters is that its value increases steadily and accurately. MusicTime is based not on the real world, but on the score; the first event in the score is presumably assigned a MusicTime of 0, and subsequent events are given a MusicTime representing the amount of time that should elapse between the beginning of the piece and an event in the performance. Thus, MusicTime indicates the location in the score.

The machine must keep track of not only of the performer's location in the score, but also the tempo at which the performance is executed. This is measured as RelativeTempo, which is a ratio of the speed at which the performer is playing to the speed of the expected performance. For example, if the performer is playing twice as fast as expected, RelativeTempo is equal to 2.0. The value of RelativeTempo can be calculated at any point in the performance so long as the RealTime at which the performer arrived at any two points x and y of the score is known.

$$\text{RelativeTempo}=(\text{MusicTime}_y-\text{MusicTime}_x)/(\text{RealTime}_y-\text{RealTime}_x).$$

Whenever a known correspondence exists between RealTime and MusicTime, the variables LastRealTime and LastMusicTime are set to the respective current values of RealTime and MusicTime. LastRealTime and LastMusicTime may then be used as a reference for estimating the current value for MusicTime in the following manner:

$$\text{MusicTime}=\text{LastMusicTime}+((\text{RealTime}-\text{LastRealTime})*\text{RelativeTempo}).$$

As the equation above indicates, the performer's location in the score can be estimated at any time using LastMusicTime, LastRealTime, and RelativeTempo (the value of RealTime must always be available to the machine).

The variables described above may be any numerical variable data type which allows time and tempo information to be stored, e.g. a byte, word, or long integer.

Score tracking takes place in either, or both, of two ways: (1) the performance is correlated to the score in the absence of any knowledge or certainty as to which part of the score the musician is performing (referred to below as "Auto-Start" and "Auto-Jump") or (2) the performance is correlated to the score using the performer's current location in the score as a starting point, referred to below as "Normal Tracking."

The Auto-Start or Auto-Jump tracking method makes it possible to (i) rapidly determine the musician's location in the score when the musician begins performing as well as (ii) determining the musician's location in the score should the musician abruptly transition to another part of the score during a performance. Normal Tracking allows the musician's performance to be tracked while the musician is performing a known portion of the score. In some embodiments the score may be initially tracked using "Auto-Start" in order to locate the performer's position in the score. Once the performer's position is located, further performance may be tracked using Normal Tracking.

This score-tracking feature can be used in any number of applications, and can be adapted specifically for each. Examples of possible applications include, but are certainly not limited to: (1) providing a coordinated audio, visual, or audio-visual accompaniment for a performance; (2) synchronizing lighting, multimedia, or other environmental factors to a performance; (3) changing the musical expression of an accompaniment in response to input from the soloist; (4) changing the manner in which a coordinated audio, visual, or audio-visual accompaniment proceeds (such as how brightly a light shines) in response to input from the soloist; (5) producing a real-time analysis of the soloist's performance (including such information as note accuracy, rhythm accuracy, tempo fluctuation, pedaling, and dynamic expression); (6) reconfiguring a performance instrument (such as a MIDI keyboard) in real time according to the demands of the musical score; and (7) correcting the performance of the soloist before the notes of the soloist's performance become audible to the listener. Further, the invention can use standard MIDI files of type 0 or type 1 and may output MIDI Time Code, SMPTE Time Code, or any other proprietary time code that can synchronize an accompaniment or other output to the fluctuating performance (e.g., varying tempo or volume) of the musician.

General Overview of the Apparatus

FIG. 1A shows an overall functional block diagram of the machine 10. In brief overview, the machine 10 includes a score processor 12, an input processor 14, and an output processor 18. FIG. 1A depicts an embodiment of the machine which also includes a user interface 20 and a real-time clock 22 (shown in phantom view). The real-time clock 22 may be provided as an incrementing register, a memory element storing time, or any other hardware or software. As noted above, the real-time clock 22 should provide a representation of time in units small enough to be musically insignificant, e.g. milliseconds. Because the value of RealTime must always be available to the machine 10, if a real-time clock 22 is not provided, one of the provided elements must assume the duty of tracking real-time. The conceptual units depicted in FIG. 1A may be provided as a combined whole, or various units may be combined in orders to form larger conceptual sub-units, for example, the input processor and the score processor need not be separate sub-units.

The score processor 12 converts a musical score into a representation that the machine 10 can use, such as a file of information. The score processor 12 does any necessary pre-processing to format the score. For example, the score processor 12 may load a score into a memory element of the machine from a MIDI file or other computer representation, change the data format of a score, assign importance attributes to the score, or add other information to the score useful to the machine 10. Alternatively, the score processor 12 may scan "sheet music," i.e., printed music scores, and perform the appropriate operations to produce a computer representation of the score usable by the machine 10. Also, the score processor 12 may separate the performance score from the rest of the score ("the accompaniment score").

In embodiments of the machine 10 including a user interface 20 (shown in phantom view) the user interface 20 provides a means for communication in both directions between the machine and the user (who may or may not be the same person as the performer). The user interface 20 may be used to direct the score processor 12 to load a particular performance score from one or more mass storage devices. The user interface 20 may also provide the user with a way to enter other information or make selections. For example, the user interface 20 may allow the performer to assign importance attributes (discussed below) to selected portions of the performance score.

The processed performance score is made available to the input processor 14. The performance score may be stored by the score processor 12 in a convenient, shared memory element of the machine 10, or the score processor 12 may store the performance score locally and deliver it to the input processor 14 as the input processor requires additional portions of the performance score.

The input processor 14 receives performance input. Performance input can be received as MIDI messages, one note at a time. The input processor 14 compares each relevant performance input event (e.g. each note-on MIDI message) with the processed performance score. The input processor may also keep track of performance tempo and location, as well as volume level, if volume information is desirable for the implementation. The input processor 14 sends and receives such information to at least the output processor 18.

The output processor 18 creates an output stream of tracking information which can be made to be available to a "larger application" (e.g. an automatic accompanist) in whatever format needed. The output stream may be an output stream of MIDI codes or the output processor 18 may directly output musical accompaniment. Alternatively, the output stream may be a stream of signals provided to a non-musical accompaniment device.

Figure 1B:
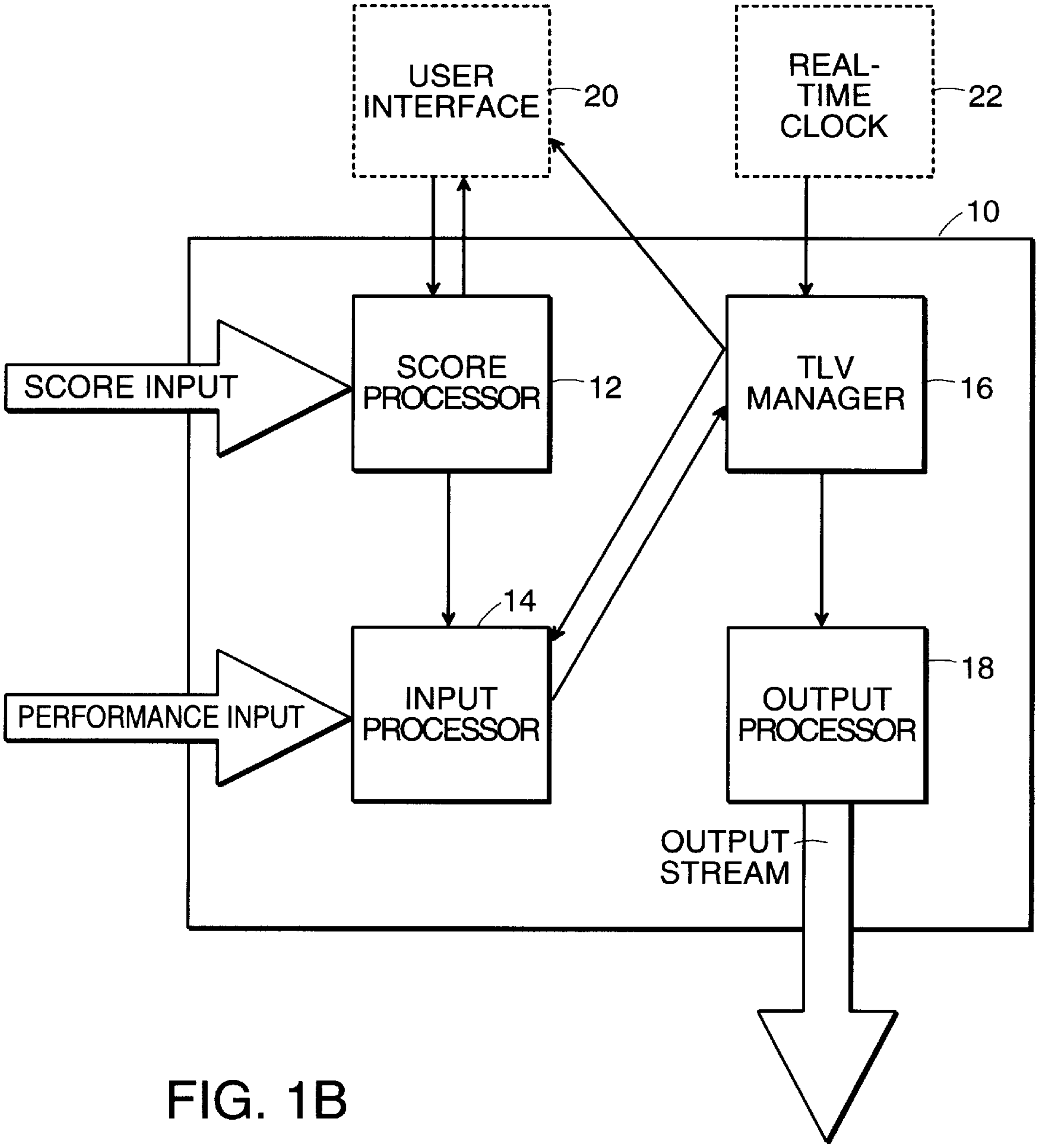
FIG. 1B is a functional block diagram of an embodiment of an apparatus for correlating a performance to a score.

FIG. 1B depicts an embodiment of the system in which the tasks of keeping track of the performance tempo and location with respect to the score, as well as volume level, if volume information is desirable for the implementation, has been delegated to a separate subunit called the tempo/location/volume manager 16. In this embodiment, the input processor 14 provides information regarding score correlation to the TLV manager 16. The TLV manager stores and updates tempo and location information and sends or receives necessary information to and from the input processor 14, the output processor 18, as well as the user interface 20 and the real-time clock 22, if those functions are provided separately.

Figure 2:
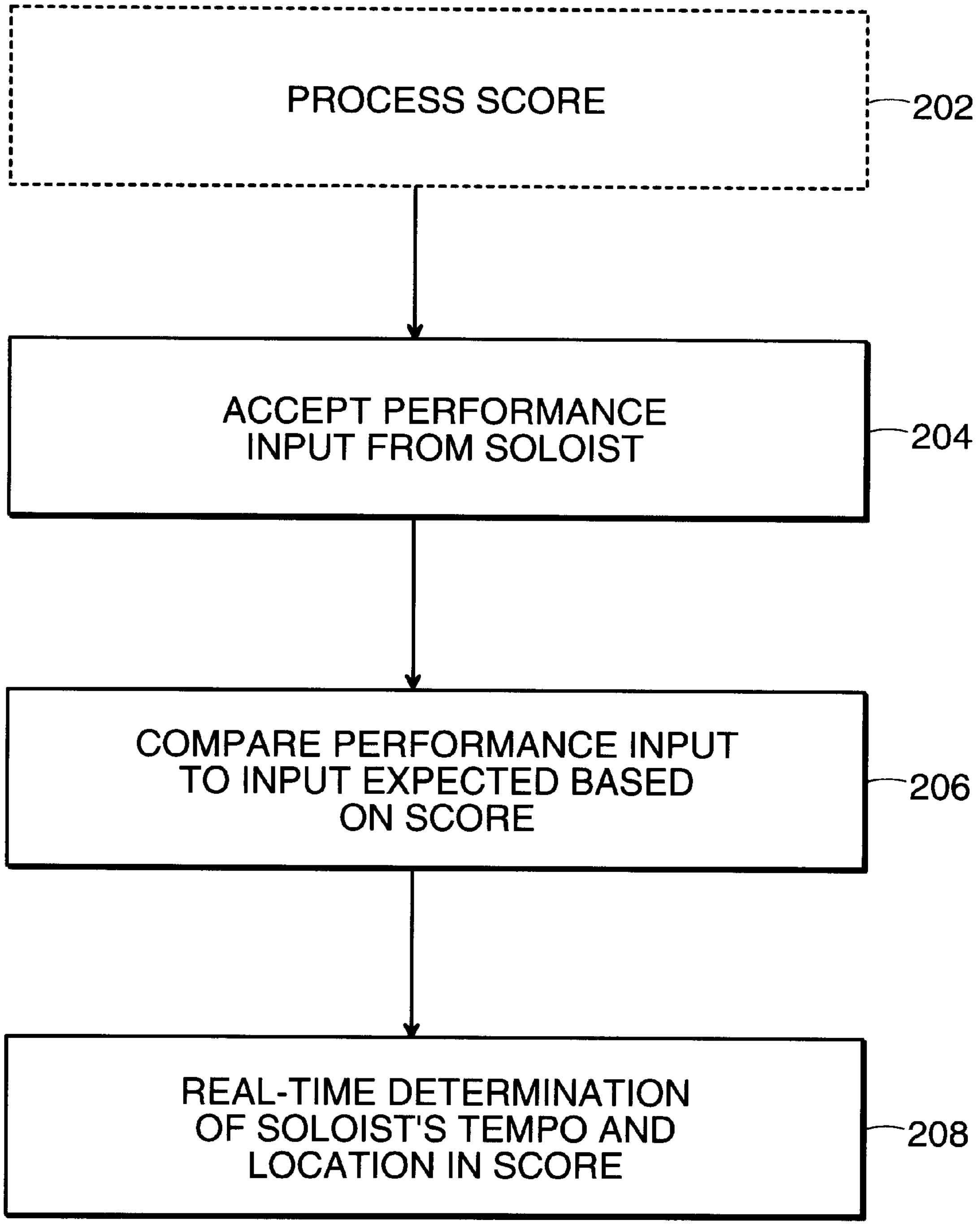
FIG. 2 is a schematic flow diagram of the overall steps to be taken in correlating a performance input to a score.

FIG. 2 is flowchart representation of the overall steps to be taken in tracking an input performance. In brief overview, a score may be processed to render it into a form useable by the machine 10 (step 202, shown in phantom view), performance input is accepted from the performer (step 204), the performance input is compared to the expected input based on the score (step 206), and a real-time determination of the performance tempo, performance location, and perhaps performance volume, is made (step 208). Steps 204, 206, and 208 are repeated for each performance input received.

Description of the Score Processor

The score represents the expected performance. An unprocessed score consists of a number of notes and chords arranged in a temporal sequence. After processing, the score consists of a series of chords, each of which consists of one or more notes. The description of a chord includes the following: its MusicTime, a description of each note in the chord (for example, a MIDI system includes note and volume information for each note-on event), and any importance attributes associated with the chord. The description of each chord should also provide a bit, flag, or some other device for indicating whether or not each note has been matched, and whether or not the chord has been matched. Additionally, each chord's description could indicate how many of the chord's notes have been matched.

As shown in FIG. 2, a musical score may be processed into a form useable by the machine 10. Processing may include translating from a particular electronic form, e.g. MIDI, to a form specifically used by the machine 10, or processing may require that a printed version of the score is converted to an electronic format. In some embodiments, the score may be captured while an initial performance is executed, e.g. a jazz "jam" session. In some embodiments the score may be provided in a format useable by the machine 10, in which case no processing is necessary and step 202 could be eliminated.

Figure 3:
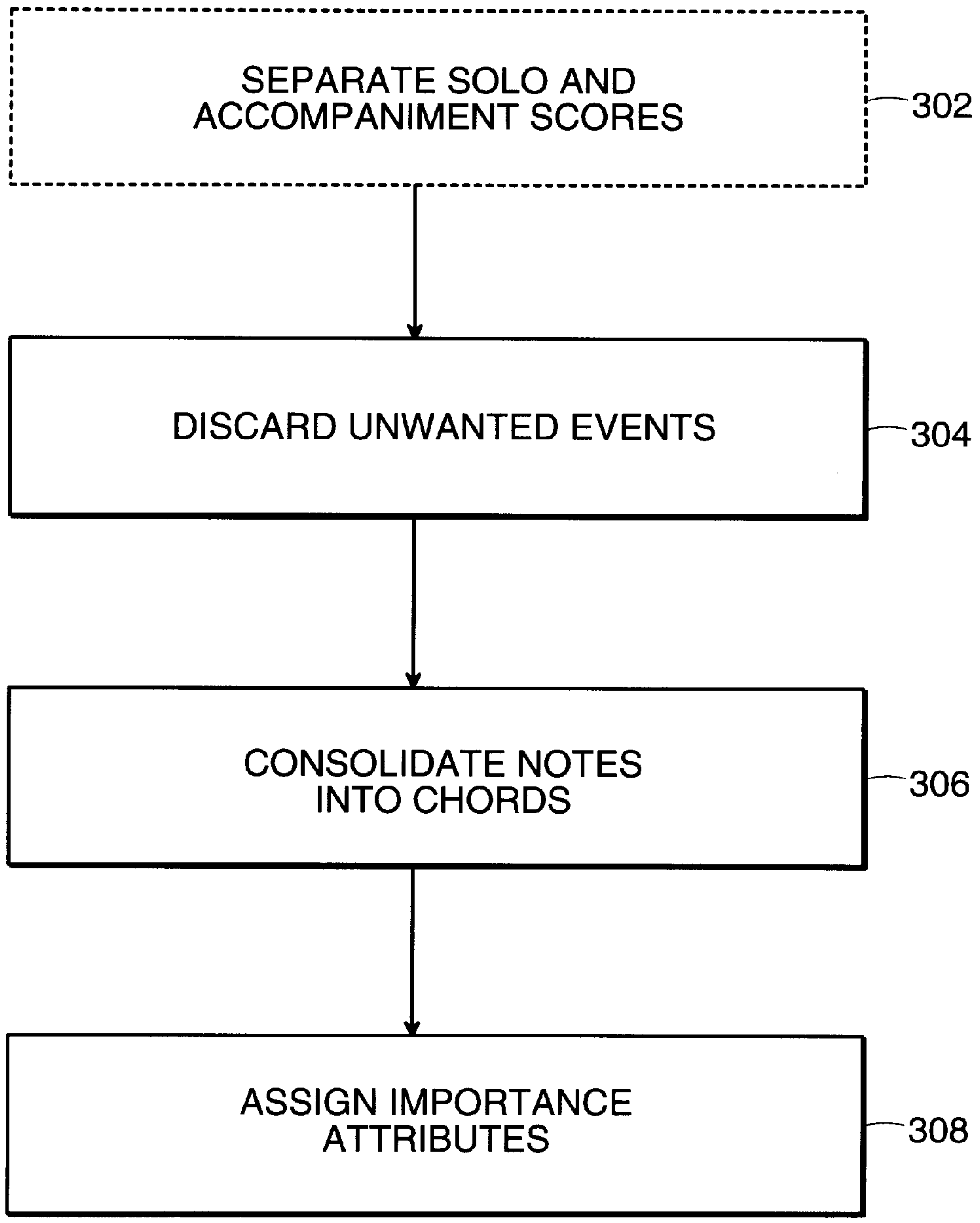
FIG. 3 is a schematic flow diagram of the steps to be taken in processing a score.

Referring now to FIG. 3, the steps to be taken in processing a score are shown. Regardless of the original form of the score, the performance score and the accompaniment score are separated from each other (step 302, shown in phantom view), unless the score is provided with the performance score already separated. The accompaniment score may be saved in a convenient memory element that is accessible by at least the output manager 18. Similarly, the performance score may be stored in a memory element that is shared by at least the input processor 14 and the score processor 12. Alternatively, the score processor 12 may store both the accompaniment score and the performance score locally and provide portions of those scores to the input processor 14, the output manager 18, or both, upon request.

The score processor 12 begins performance score conversion by discarding events that will not be used for matching the performance input to the score (for example, all MIDI events except for MIDI "note-on" events) (step 304). In formats that do not have unwanted events, this step may be skipped.

Once all unwanted events are discarded from the performance score, the notes are consolidated into a series of chords (step 306). Notes within a predetermined time period are consolidated into a single chord. For example, all notes occurring within a 50 millisecond time frame of the score could be consolidated into a single chord. The particular length of time is adjustable depending on the particular score, the characteristics of the performance input data, or other factors relevant to the application. In some embodiments, the predetermined time period may be set to zero, so that only notes that are scored to sound together are consolidated into chords.

Once separate notes have been consolidated into chords, each chord is assigned zero or more importance attributes (step 308). Importance attributes convey performance-related and accompaniment information. Importance attributes may be assigned by the machine 10 using any one of various algorithms. The machine must have an algorithm for assigning machine-assignable importance attributes; such an algorithm could vary significantly depending on the application. Machine-assigned importance attributes can be thought of as innate musical intelligence possessed by the machine 10. In addition to machine-assignable importance attributes, importance attributes may be assigned by the user. A user may assign importance attributes to chords in the performance score using the user interface 20, when provided. User assignable importance attributes may be thought of as learned musical intelligence.

The following is a description of various importance attributes which the machine 10 may assign to a given chord, with a description of the action taken when a chord with that particular importance attribute is matched by the input processor 14. The following list is exemplary and not intended to be exhaustive. For example, additional importance attributes may be generated which have particular application to the scores, accompaniments, and applications. This list could vary considerably among various implementations; it is conceivable that an implementation could require no importance attributes. The following exemplary importance attributes would be useful for automatic accompanying applications.

AdjustLocation

If this importance attribute is assigned to a chord or note which is subsequently matched, the machine 10 immediately moves to the chord's location in the score. This is accomplished by setting the variable LastMusicTime to the chord's MusicTime, and setting LastRealTime equal to the current RealTime.

TempoReferencePoint

If this importance attribute is assigned to a subsequently matched chord or note, information is saved so that this point can be used later as a reference point for calculating RelativeTempo. This is accomplished by setting the variable ReferenceMusicTime equal to the MusicTime of matched chord or note, and setting ReferenceRealTime equal to the current value of RealTime.

TempoSignificance

This importance attribute is a value to be used when adjusting the tempo (explained in the next item); this is meaningless unless an AdjustTempo signal is present as well. There might be, for example, four possible values of TempoSignificance: 25%, 50%, 75%, and 100%.

AdjustTempo

If this importance attribute is assigned to a subsequently matched chord or note, the tempo since the last TempoReferencePoint is calculated by dividing the difference of the chord's MusicTime and ReferenceMusicTime by the difference of the current RealTime and ReferenceRealTime, as follows:

RecentTempo=(MusicTime−ReferenceMusicTime)/(RealTime−ReferenceRealTime)

The calculated value of RecentTempo is then combined with the previous RelativeTempo (i.e. the variable RelativeTempo) with a weighting that depends on the value of TempoSignificance (see above), as follows:

RelativeTempo=(TempoSignificance*RecentTempo)+((1−TempoSignificance)*RelativeTempo)

Thus, for example, if the previous value of RelativeTempo is 1.5 and the RecentTempo is 1.1, a TempoSignificance of 25% would yield a new Tempo of 1.4, a TempoSignificance of 50% would yield 1.3, etc. If a chord has both AdjustTempo and TempoReferencePoint Importance Attributes, the AdjustTempo needs to be dealt with first, or the calculation will be meaningless.

For example, an importance attribute may signal where in a particular measure a chord falls. In this example, which is useful for score-tracking embodiments: an importance attribute could be assigned a value of 1.00 for chords falling on the first beat of a measure; an importance attribute could be assigned a value of 0.25 for each chord falling on the second beat of a measure; an importance attribute could be assigned a value of 0.50 for each chord that falls on the third beat of a measure; and an importance attribute could be assigned a value of 0.75 for each chord that falls on the fourth or later beat of a measure. An even simpler example which might be effective for an application that is only interested in knowing when each chord is played would be assigning to each chord the Adjust Location attribute. (It is possible that these or other algorithms would not be applied at this time by the score processor 12, but "on the fly" by the input processor 14; in such a case, when a given chord is matched, the algorithm would be applied for that chord only to determine its importance attributes, if any.)

The following is an exemplary list of user-assignable importance attributes which may be assigned by the user. The list would vary considerably based on the implementation of the machine; certain implementations could provide no user-assignable importance attributes.

WaitForThisChord

If this importance attribute is assigned to a chord or note, score tracking should not proceed until the chord or note has been matched. In other words, if the chord is performed later than expected, MusicTime will stop moving until the chord or note is played. Thus, the result of the formula given above for calculating MusicTime would have to check to ensure that it is not equal to or greater than the MusicTime of an unmatched chord or note also assigned this importance attribute. When the chord or note is matched (whether it's early, on time, or late), the same actions are taken as when a chord assigned the AdjustLocation importance attribute is matched; however, if the chord has the AdjustTempo importance attribute assigned to it, that attribute could be ignored. The effect of this attribute would be that, in an automatic accompaniment system, the accompaniment would wait for the performer to play the chord before resuming.

RestoreTempo

If this importance attribute is assigned to a chord or note which is subsequently matched, the tempo should be reset to its default value; this can be used, for example, to signal an "a tempo" after a "ritard" in the performance. The value of RelativeTempo is set to its default value (usually 1.0), rather than keeping it at its previous value or calculating a new value.

WaitForSpecialSignal

This importance attribute can be used for a number of purposes. For example, it may signify the end of an extended cadenza passage (i.e. a section where the soloist is expected to play many notes that are not in the score). The special signal could be defined, perhaps by the user, to be any input distinguishable from performance input (e.g. a MIDI message or a note the user knows will not be used during the cadenza passage). An unusual aspect of this importance attribute is that it could occur anywhere in the piece, not just at a place where the soloist is expecting to play a note; thus a different data structure than the normal chord format would have to be used—perhaps a chord with no notes. This attribute is similar to WaitForThisChord, in that the formula for calculating MusicTime would have to check to ensure that the result is at least one time unit less than the MusicTime of this importance attribute, and that, when the special signal is received, the same actions are taken as when a chord with the AdjustLocation importance attribute is matched. The effect in the example above would be that the automatic accompaniment would stop while the musician performs the cadenza, and would not resume until a special signal is received from the performer.

IgnorePerformer

The user could select a certain portion of the score as a section where the performer should be ignored, i.e., the tracking process would be temporarily suspended when the performer gets to that part of the score, and the MusicTime would move regularly forward regardless of what the performer plays. As in the case of WaitForSpecialSignal above, this attribute would not be stored in the same way as regular importance attributes, as it would apply to a range of times in the score, not to a particular chord.

Once importance attributes are assigned, whether by the user or by the machine 10, the performance score has been processed. The performance score is then stored in a convenient memory element of the machine 10 for further reference.

The steps described above may be taken seriatim or in parallel. For example, the score processor 12 may discard unwanted events (step 304) from the entire score before proceeding to the consolidation step (step 306). Alternatively, the score processor 12 may discard unwanted events (step 304) and consolidate chords (step 306) simultaneously. In this embodiment, any interlock mechanism known in the art may be used to ensure that notes are not consolidated before events are discarded.

Description of the Input Processor

Returning to FIG. 2, performance input is accepted from the performer in real-time (step 204). Performance input may be received in a computer-readable form, such as MIDI data from a keyboard which is being played by the performer. Additionally, input may be received in analog form and converted into a computer-readable form by the machine 10. For example, the machine 10 may be provided with a pitch-to-MIDI converter which accepts acoustic performance input and converts it to MIDI data.

The performance input received is compared, in real-time, to the expected input based on the performance score (step 206). Comparisons may be made using any combination of pitch, MIDI voice, expression information, timing information, or other information. The comparisons made in step 206 result in a real-time determination of the performer's tempo and location in the score (step 208). The comparisons may also be used to determine, in real-time, the accuracy of the performer's performance in terms of correctly played notes and omitted notes, the correctness of the performer's performance tempo, and the dynamic expression of the performance relative to the performance score.

Figure 4:
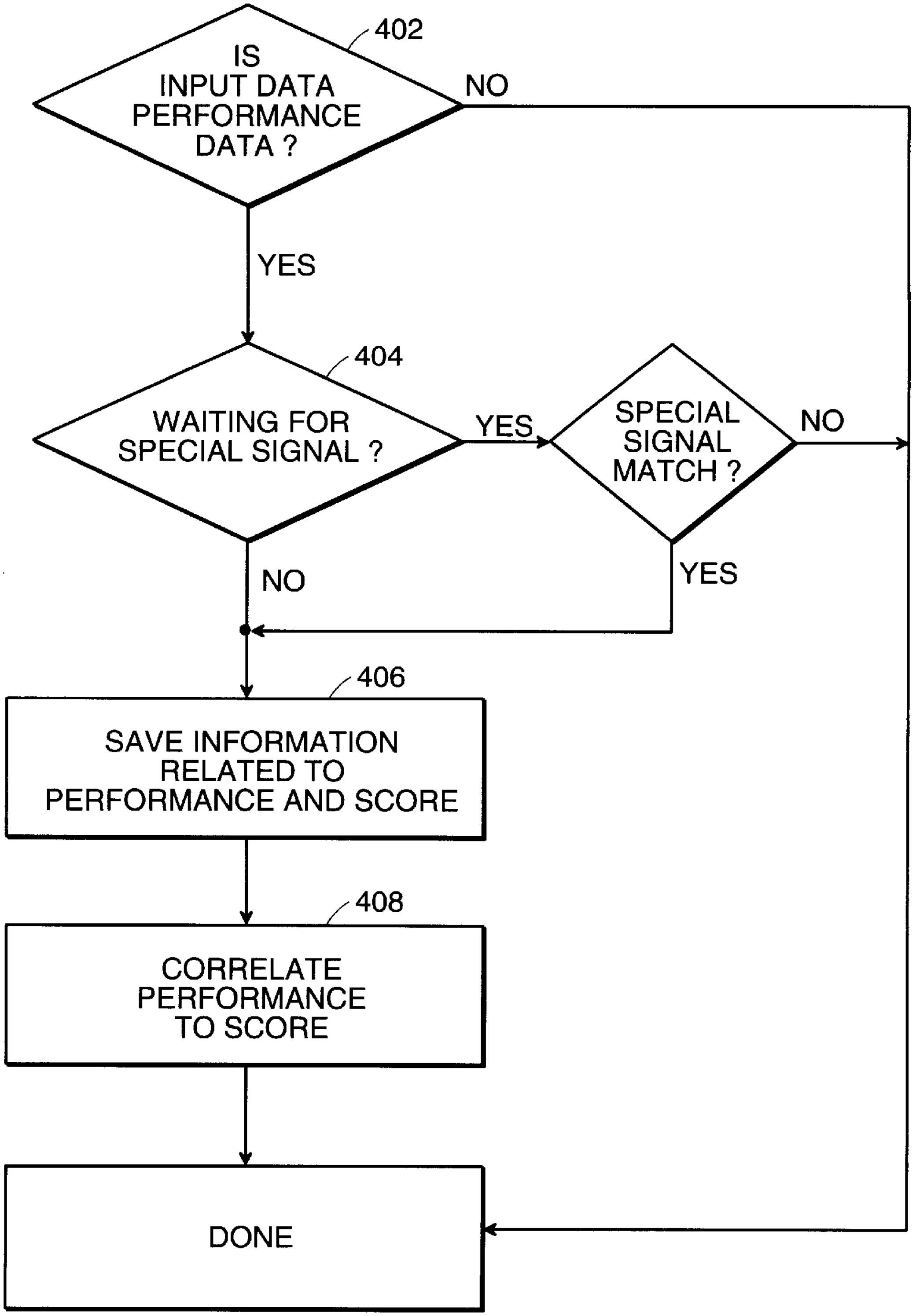
FIG. 4 is a schematic flow diagram of the steps taken by the input processor of FIG. 1.

FIG. 4 is a flowchart representation of the steps taken by the input processor 14 when performance input is accepted. First, the input processor 14 ascertains whether the input data are intended to be control data (step 402). For example, in one embodiment the user may define a certain pitch (such as a note that is not used in the piece being played), or a certain MIDI controller, as signaling a particular control function. Any control function can be signaled in this manner including: starting or stopping the tracking process, changing a characteristic of the machine's output (such as the sound quality of an automatic accompaniment), turning a metronome on or off, or assigning an importance attribute. Regardless of its use, if such signal is detected, an appropriate message is sent to the TLV manager 16 (step 410), which in turn may send an appropriate message to the user interface 20 or the output processor 18, and the input processor 14 is finished processing that performance input data. For embodiments in which no TLV manager 16 is provided, the input processor 14 sends an appropriate message directly to the user interface 20 or output processor 18. If the particular embodiment does not support control information being received as performance input, this step may be skipped.

If the data received by the input processor 14 is not control information, then the input processor 14 must determine whether or not the machine 10 is waiting for a special signal of some sort (step 404). The special signal may be an attribute assigned by the user (e.g. WaitForSpecialSignal, discussed above). This feature is only relevant if the machine is in Normal Tracking mode. The performance input data is checked to see if it represents the special signal (step 412); if so, the TLV manager (step 414), if provided, is notified that the special signal has been received. Regardless of whether the input data matches the special signal, the input processor 14 is finished processing the received performance input data.

If the machine 10 is not waiting for a special input signal, the performance input data is checked to determine if it is a note (step 405). If not, the input processor 14 is finished processing the received performance input data. Otherwise, the input processor 14 saves information related to the note played and the current time for future reference (step 406). This information may be saved in an array representing recent notes played; in some embodiments stored notes are consolidated into chords in a manner similar to that used by the score processor 12. The array then might consist of, for example, the last twenty chords played. This information is saved in order to implement the Auto-Start and Auto-Jump features, discussed below.

A different process is subsequently followed depending on whether or not the machine 10 is in Normal Tracking mode (step 407). If it is not, this implies that the machine 10 has no knowledge of where in the score the performer is currently playing, and the next step is to check for an Auto-Start match (step 416). If Auto-Start is implemented and enabled, the input processor 14 monitors all such input and, with the help of the real-time clock 22, it compares the input received to the entire score in an effort to determine if a performance of the piece has actually begun. An Auto-Start match would occur only if a perfect match can be made between a sequence of recently performed notes or chords (as stored in step 406) and a sequence of notes/chords anywhere in the score. The "quality" of such a match can be determined by any number of factors, such as the number of notes/chords required for the matched sequences, the amount of time between the beginning and end of the matched sequences (RealTime for the sequence of performed notes/chords, MusicTime for the sequence of notes/chords in the score), or the similarity of rhythm or tempo between the matched sequences. This step could in certain cases be made more efficient by, for example, remembering the results of past comparisons and only having to match the current note to certain points in the score. In any case, if it is determined that an Auto-Start match has been made, the Normal Tracking process begins. In embodiments providing a TLV manager 16, the input processor 14 sends a message to the TLV manager (step 418) notifying it of the switch to Normal Tracking. Whether or not an Auto-Start match is found, the input processor 14 is finished processing that performance input data. If Auto-Start is not implemented or enabled, this step could be skipped.

Once the Normal Tracking process has begun, the input processor 14, with the help of information from the TLV manager 16 and the real-time clock 22, if provided, compares each relevant performance input event (e.g. each event indicating that a note has been played) with individual notes of the performance score; if a suitable match is found, the input processor 14 determines the location of the performance in the score and its tempo (and perhaps the volume level). The input processor 14 passes its determinations to the TLV manager 16 in embodiments that include the TLV manager 16. If step 407 determined that the Normal Tracking process was already underway, the received performance input data is now ready to be correlated to the performance score (step 408), detailed in FIG. 5.

Figure 5:
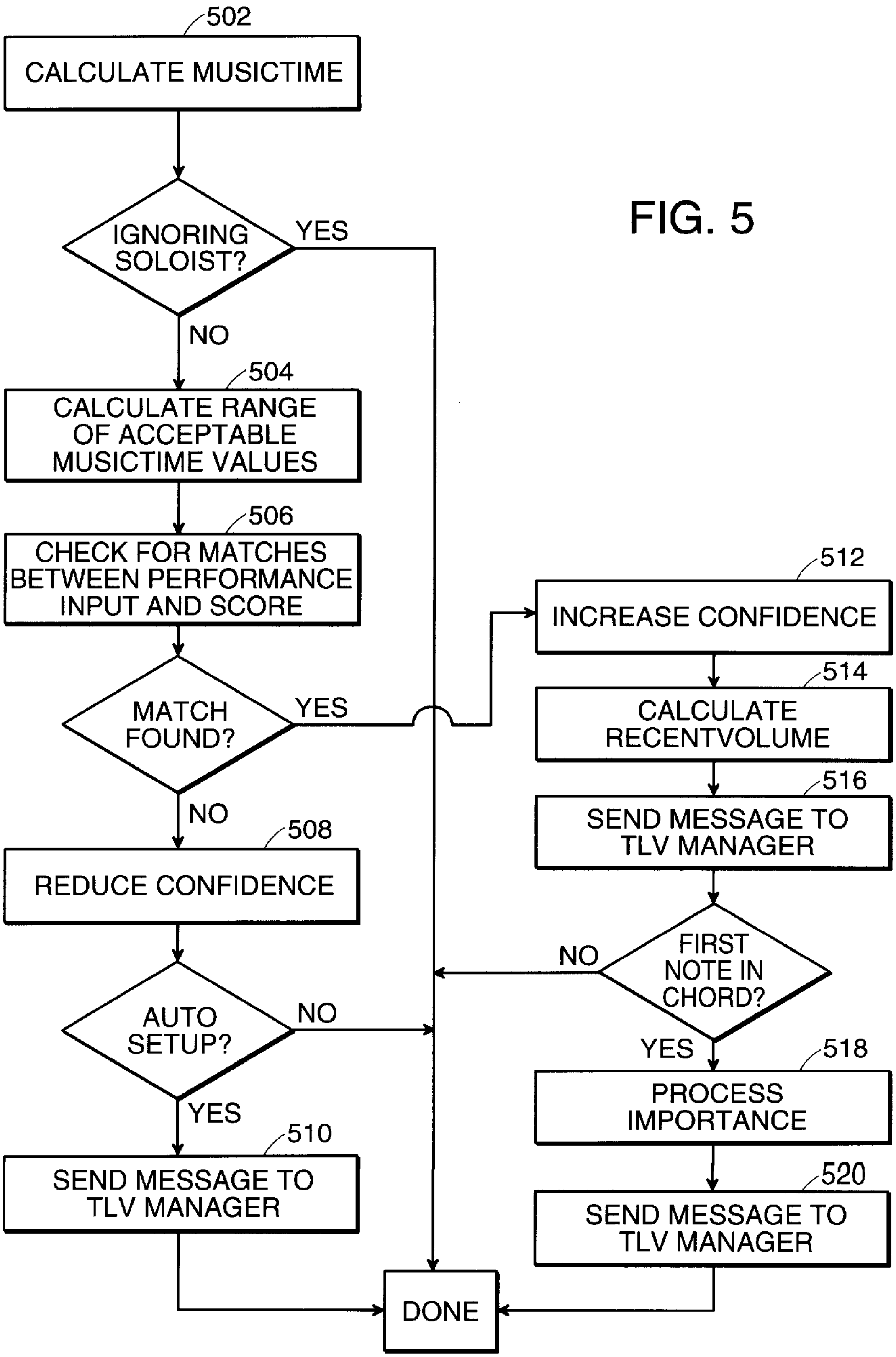
FIG. 5 is a schematic flow diagram of the steps to be taken in correlating a performance input data to a score.

Referring to FIG. 5, the first step is to calculate EstimatedMusicTime (step 502) as described above, which is the machine's best guess of the performer's location in the score.

EstimatedMusicTime may be calculated using the formula for MusicTime above:

EstimatedMusicTime=LastMusicTime+((RealTime−LastRealTime)*RelativeTempo)

In another embodiment, the following formula could be used:

EstimatedMusicTime=LastMatchMusicTime+((RealTime−LastMatchRealTime)*RelativeTempo)

where LastMatchRealTime is the RealTime of the previous match, and LastMatchMusicTime is the MusicTime of the previous match. In another embodiment, both formulas are used: the first equation may be used if there have been no correlation for a predetermined time period (e.g., several seconds) or there has yet to be a correlation (the beginning of the performance); and the second equation may be used if there has been a recent correlation. At any rate, EstimatedMusicTime is a MusicTime, and it gives the machine 10 a starting point in the score to begin looking for a correlation.

The machine 10 uses EstimatedMusicTime as a starting point in the score to begin scanning for a performance correlation. A range of acceptable MusicTimes defined by MinimumMusicTime and MaximumMusicTime is calculated (step 504). In general, this may be done by adding and subtracting a value from EstimatedMusicTime. In some embodiments, performance input data that arrives less than a predetermined amount of time after the last performance input data that was matched (perhaps fifty milliseconds), is assumed to be part of the same chord as the last performance input data. In this case, EstimatedMusicTime would be the same as LastMatchMusicTime (the MusicTime of the previously matched chord).

For example, MinimumMusicTime might be set to one hundred milliseconds before the halfway point between EstimatedMusicTime and LastMatchMusicTime or LastMusicTime (whichever was used to calculate EstimatedMusicTime), yet between a certain minimum and maximum distance from EstimatedMusicTime. Similarly, MaximumMusicTime could be set to the same amount of time after EstimatedMusicTime. If it was determined in step 502 that the performance input data is probably part of the same chord as the previously matched performance input data, MinimumMusicTime and MaximumMusicTime could be set very close to, if not equal to, EstimatedMusicTime. In any event, none of MaximumMusicTime, EstimatedMusicTime, and MinimumMusicTime should exceed the MusicTime of an unmatched chord with a WaitForThisChord or WaitForSpecialSignal importance attribute.

Once a range for MusicTime values is established, the performance input event is compared to the score in that range (step 506). Each chord between MinimumMusicTime and MaximumMusicTime should be checked to see if it contains a note that corresponds to the performance input event that has not previously been used for a match until a match is found or until there are no more chords to check. The chords might be checked in order of increasing distance (measured in MusicTime) from EstimatedMusicTime. When a note in the score is matched, it is so marked, so that it cannot be matched again.

If no match is found (step 506), the next step is to look for an Auto-Jump match (step 509); if the Auto-Jump feature is not implemented or is not enabled, this step can be skipped. This process is similar to looking for an Auto-Start Match (step 416), except that different criteria might be used to evaluate the "quality" of the match between two sequences. For example, a preponderance of recent performance input that yielded no match in step 506 (i.e. a number of recent "wrong notes" from the performer) might reduce the "quality," i.e., the number of correctly matched notes, required to determine that a particular sequence-to-sequence match signifies an Auto-Jump match; on the other hand, if the current performance input was the first in a long time that did not yield a match in step 506, it would probably be inappropriate to determine that an Auto-Jump match had been found, no matter how good a sequence-to-sequence match was found. At any rate, if it is determined that an Auto-Jump match has indeed been found, an Auto-Jump should be initiated, and to what location in the score the jump should be made. In embodiments that include a TLV manager 16, a message should be sent to the TLV manager 16 indicating that an Auto-Jump should be initiated (step 510). An Auto-Jump might be implemented simply by stopping the tracking process and starting it again by effecting an Auto-Start at the location determined by the Auto-Jump match. In any case, the match checker 408, and therefore the input processor 14, is now done processing this performance input data.

If a regular (as opposed to Auto-Jump) match is found in step 506, the RelativeVolume, an expression of the performer's volume level compared to that indicated in the score, should be calculated, assuming that volume information is desirable for the implementation (step 514).

RelativeVolume might be calculated as follows:

RelativeVolume=((RelativeVolume*9)+ThisRelativeVolume)/10 where ThisRelativeVolume is the ratio of the volume of the note represented by the performance input event to the volume of the note in the score. The new value of RelativeVolume could be sent to a TLV Manager 16 (step 516), when provided, which would send it to the output processor 18.

The next step is to determine if the match in step 506 warrants declaring that the chord containing the matched note has been matched (step 517) because a matched note does not necessarily imply a matched chord. A chord might be deemed matched the first time one of its notes are matched; or it might not be considered matched until over half, or even all, of its notes are matched. At any rate, if a previously unmatched chord has now been matched, the chord's importance attributes, if any, must be processed, as discussed above (step 518). Any new values of the variables LastMusicTime, LastRealTime, and RelativeTempo are then communicated to the TLV Manager 16 (step 520), if provided.

Operation of the TLV Manager and Output Processor

Returning once again to FIG. 1B and as can be seen from the above description, the TLV Manager 16, when provided, acts as a clearinghouse for information. It receives (sometimes calculates, with the help of a real-time clock 22) and stores all information about tempo (RelativeTempo), location in the score (MusicTime), volume (Relative Volume), and any other variables. It also receives special messages from the input processor 14, such as that a special signal (defined as a user-assigned importance attribute) has been received, or that an Auto Jump or Auto Start should be initiated, and does whatever necessary to effect the proper response. In general, the TLV Manager 16 is the supervisor of the whole machine, making sure that all of the operating units have whatever information they need. If no TLV manager 16 is provided, the input processor 14 shoulders these responsibilities.

The output processor 18 is responsible for communicating information to the specific application that is using the machine. This could be in the form of an output stream of signals indicating the values of LastMusicTime, LastRealTime, RelativeTempo, and RelativeVolume any time any of these values change. This would enable the application to calculate the current MusicTime (assuming that it has access to the real-time clock 22), as well as to know the values of RelativeTempo and RelativeVolume at any time. Alternatively, the output processor 18 could maintain these values and make them available to the application when requested by the application. Additionally, the output could include an echo of each received performance input event, or specific information such as whether that note was matched.

EXAMPLE I

One example of a system using the machine 10 would be one that automatically synchronizes a MIDI accompaniment to a performance. Such a system would involve an "accompaniment score" in addition to the score used by the machine 10 (herein called "solo score"), and would output MIDI data from the accompaniment score to whatever MIDI device or devices are connected to the system; the result would be dependent on the devices connected as well as on the contents of the accompaniment score. The MIDI output might also include an echo of the MIDI data received from the performer.

The solo score could be loaded and processed (step 202) by the score processor 12 from one track of a Standard MIDI File (SMF), while the other tracks of the file ("accompaniment tracks") could be loaded as an accompaniment score; this accompaniment score would use the same MusicTime coordinate system used by the solo score, and would likely contain all events from the accompaniment tracks, not just "note-on" events, as is the case with the solo score. The solo score could be processed as it is loaded, or the machine could process the solo score after it is completely loaded. When the performance begins (indicated either through the user interface 20 or by the input processor 14 detecting an Auto-Start), the system begins to "play" (by outputting the MIDI data) the events stored in the accompaniment score, starting at the score location indicated as the starting point. One way this might be effected is that the machine 10 could use an interrupt mechanism to interrupt itself at the time the next event in the accompaniment score is to be "played". The time for this interrupt (a RealTime) could be calculated as follows:

$$\text{InterruptRealTime}=\text{CurrentRealTime}+((\text{NextEventMusicTime}-\text{CurrentMusicTime})/\text{RelativeTempo})$$

Substituting the formula for MusicTime (above) for CurrentMusicTime, this reduces to:

$$\text{InterruptRealTime}=\text{LastRealTime}+((\text{NextEventMusicTime}-\text{LastMusicTime})/\text{RelativeTempo})$$

If this formula produces a result that is less than or equal to the CurrentRealTime (i.e. if NextEventMusicTime is less than or equal to CurrentMusicTime), the interrupt process should be executed immediately.

In applying the above formula for InterruptRealTime, no interrupt should be set up if the NextEventMusicTime is equal to or greater than the MusicTime of either an unmatched chord with the WaitForThisChord importance attribute, or a location in the score marked with the WaitForSpecialSignal importance attribute. This has the effect of stopping the accompaniment until either the awaited chord is matched or the special signal is received (step 414); when the relevant event occurs, new values of the LastMusicTime and LastRealTime are calculated (step 518) by the input processor 14 and an interrupt is set up as described above.

When the interrupt occurs, the system outputs the next MIDI event in the accompaniment score, and any other events that are to occur simultaneously (i.e. that have the same MusicTime). In doing so, the volume of any notes played (i.e. the "key velocity" of "note-on" events) could be adjusted to reflect the current value of RelativeVolume. Before returning from the interrupt process, the next interrupt would be set up using the same formula.

Synchronization could be accomplished as follows: Each performance note is received as MIDI data, which is processed by the input processor 14; any new values of LastMusicTime, LastRealTime, RelativeTempo, or RelativeVolume are sent (steps 516 and 520), via the TLV Manager 16, when provided, and the output processor 18, to the system driving the accompaniment. Whenever the system receives a new value of LastMusicTime, LastRealTime, or RelativeTempo, the pending interrupt would be immediately canceled, and a new one set up using the same formula, but with the new variable value(s).

Examples of ways a user could use such a system might include:

a) The SMF accompaniment track(s) contain standard MIDI musical messages and the output is connected to a MIDI synthesizer. The result is a musical accompaniment synchronized to the soloist's playing.

b) The SMF accompaniment track(s) contain MIDI messages designed for a MIDI lighting controller, and the output is connected to a MIDI lighting controller. The result is changing lighting conditions synchronized to the soloist's playing in a way designed by the creator of the SMF.

c) The SMF accompaniment track(s) contain MIDI messages designed for a device used to display still images and the output is connected to such a device. The result is a "slide show" synchronized to the soloist's playing in a way designed by the creator of the SMF. These "slides" could contain works of art, a page of lyrics for a song, a page of musical notation, etc.

d) Similarly, SMFs and output devices could be designed and used to control fireworks, canons, fountains, or other such items.

EXAMPLE II

In another example, the system could output time-code data (such as SMPTE time code or MIDI time code) indicating the performer's location in the score. This output would be sent to whatever device(s) the user has connected to the system that are capable of receiving output time-code or acting responsively to output time-codes; the result would be dependent on the device(s) connected.

This machine 10 could be set up almost identically to the previous example, although it might not include an accompaniment score. An interrupt mechanism similar to that used for the accompaniment could be used to output time code as well; if there indeed is an accompaniment score, the same interrupt mechanism could be used to output both the accompaniment and the time-code messages.

Since the time code indicates the performer's location in the score, it represents a MusicTime, not a RealTime. Thus, for each time-code message to be output, the system must first calculate the MusicTime at which it should be sent. (This simple calculation is, of course, dependent on the coordinate systems in which the time-code system and MusicTime are represented; as an example, if 25-frames-per-second SMPTE time code is being used, and MusicTime is measured in milliseconds, a time-code message should be sent every 40 milliseconds, or whenever the value of MusicTime reaches 401, where I is any integer.) Then, the same formula from the previous example can be used to determine the interrupt time. When the interrupt occurs, the system would output the next time-code message, and set up the next interrupt using the same formula.

Synchronization could be accomplished by means almost identical to those used in the previous example. Each performance note is processed by the input processor 14; any new values of LastMusicTime, LastRealTime, or RelativeTempos are sent (steps 516 and 520) through the TLV Manager 16, when provided, and the output processor 18 to the system driving the accompaniment. Whenever the system receives a new value of LastMusicTime, LastRealTime, or RelativeTempos, the pending interrupt would be immediately canceled, and a new one set up using the same formula, but with the new variable values. In addition, when a new value of LastMusicTime is received (which results from a chord with an AdjustLocation importance attribute being matched by the input processor 14), it might be necessary to send a time-code message that indicates a new location in the score depending on the magnitude of the re-location. However, depending on the desired application, the system might implement a means of smoothing out the jumps rather than jumping directly.

Examples of ways a user could use such a system might include: synchronizing a video to a soloist's performance of a piece; a scrolling display of the musical notation of the piece being played; or "bouncing-ball" lyrics for the song being played. And, as mentioned above, the system could output both a MIDI accompaniment, as in the previous example, and time code, as in this example.

EXAMPLE III

In another example, the system could be used to automatically change the sounds of a musician's instrument at certain points in the score, similar to automatically changing the registration on a church organ during the performance of a piece. This application could be accomplished using the system of Example I above, with the following further considerations: the SMF accompaniment track(s), and therefore the accompaniment score, should contain only MIDI messages designed to change the sound of an instrument (MIDI program-change messages); the performer's instrument should be set to not produce sound in response to the performer's playing a note; and the output stream, which should include an echo of the MIDI data received from the performer, should be connected to any MIDI synthesizer, which may or may not be the instrument being played by the performer. Thus, as the performer plays, a synchronized accompaniment, consisting of only MIDI program-change messages, will be output along with the notes of the live performance, and the sounds of the performance will be changed appropriately.

One further consideration would in many cases provide a more satisfactory result: the notes of the performance should be echoed to the output stream only after they have been fully processed by the input processor 14 and any resultant accompaniment (i.e. MIDI program-change messages) have been output by the system. To fully appreciate the advantages provided by this feature, consider the situation where the performance score contains a one-note chord with the AdjustLocation importance attribute and with a given MusicTime, and the accompaniment score contains a MIDI program-change message with the same MusicTime, indicating that the sound of the instrument should be changed when the performer plays that note. When the performer plays the note that is matched to the relevant chord: If the performance note is echoed immediately to the synthesizer, the note would sound first with the "old" sound; meanwhile, the note is processed by the input processor 14, causing a new value of LastMusicTime and LastRealTime to be set (step 518), in turn causing the system to output the program-change message; when this happens either the note which is already sounding with the "old" sound is stopped from sounding or is changed to the "new" sound, neither of which is satisfactory. However if the performance note is not echoed until after being processed by the input processor 14, the "new" sound will have already been set up on the synthesizer, and the note will sound using the expected sound.

EXAMPLE IV

In another example, the machine 10 could be configured to correct performance mistakes made by the performer before the sounds are actually heard. There are a number of ways this could be effected, one of which uses the system of Example I above, with the following considerations: the accompaniment score is loaded from the solo track of the SMF (i.e. the same track that is used to load the performance score) instead of from the non-solo tracks; the performer's instrument should be set not to produce sound in response to the performer's playing a note; and the output stream, which should not include an echo of the performer's MIDI data, should be connected to any MIDI synthesizer, which may or may not be the instrument being played by the performer. Thus, as the performer plays, a synchronized "accompaniment", consisting of the MIDI data from the original solo track, will be output. The effect is a "sanitized" performance consisting of the notes and sounds from the original solo track, but with timing and general volume level adjusted according to the performer's playing.

Other possible systems effecting this process could provide differing degrees to which the output performance reflects the original solo track and to which it reflects the actual performance. Some of these systems might involve a re-configuration of the workings of the machine 10. For example, one system might involve changing the input processor 14 so that it would cause each matched performance note to be output directly while either ignoring or changing unmatched (i.e. wrong) notes.

EXAMPLE V

In yet another embodiment, the machine 10 could provide analysis of various parameters of an input performance; this might be particularly useful in practice situations. For example, a system could automatically provide some sort of feedback when the performer plays wrong notes or wrong rhythms, varies the tempo beyond a certain threshold, plays notes together that should not be together or plays notes separately that should be together, plays too loud or too soft, etc. A simple example would be one in which the system receives values of RelativeTempo, RelativeVolume, LastMusicTime, and LastRealTime from the output processor 18 and displays the performer's location in the piece as well as the tempo and volume level relative to that expected in the score.

Other possible systems effecting this process could provide analyses of different aspects of the performance. Some of these systems might involve a re-configuration of the workings of the machine 10, possibly requiring the input processor 14 to output information about each received note.

EXAMPLE VI

The machine 10 could be designed to save the performance by storing each incoming MIDI event as well as the RealTime at which it arrived. The performance could then be played back at a later time, with or without the accompaniment or time-code output; it could also be saved to disk as a new SMF, again with or without the accompaniment.

The playback or the saved SMF might incorporate the timing of the performance; in that case the timing of the accompaniment could be improved over what occurred during the original performance, since the system would not have to react to the performance in real time. Indeed, during the original performance, the input processor 14 can notice a change in tempo only after it has happened (step 518), and the tempo of the accompaniment will only change after it has been so noticed; in a playback or in the creation of a new SMF, the tempo change can be effected at the same point in the music where it occurred in the performance.

There are a number of playback/saving options that could either be determined by the system or set by the user, for example: whether to use the timing from the original performance or from the original SMF; if the timing of the original performance is used, whether to make the adjustment to the accompaniment described in the previous paragraph or to output the accompaniment exactly as it was played during the original performance; whether to use the actual notes from the original performance, or to output a sanitized version of the solo part-incorporating the timing of the performance but the MIDI data from the solo track of the SMF; whether to output the volumes from the original performance or from the corresponding notes in the performance score, etc.

For example, by recording a performance and then saving it with the accompaniment as a new SMF using the timing of the performance but the notes from the original SMF, a SMF can be created that might more closely represent the expected timing of a given performer, even if the performance was less than 100% accurate. If this new SMF is used for subsequent score tracking, the accompaniment might be better synchronized to the performance; thus the creation of the new SMF might be thought of as representing a "rehearsal" with the performer.

The apparatus of the present invention may be provided as specialized hardware performing the functions described herein, or it may be provided as a general-purpose computer running appropriate software. When reference is made to actions which the machine 10 takes, those actions may be taken by any subunit of the machine 10, i.e., those actions may be taken by the input processor 14, the TLV manager 16, the score processor 12 or the output processor 18. The selection of the processor to be used in performing a particular task is an implementation specific decision.

Figure 6:
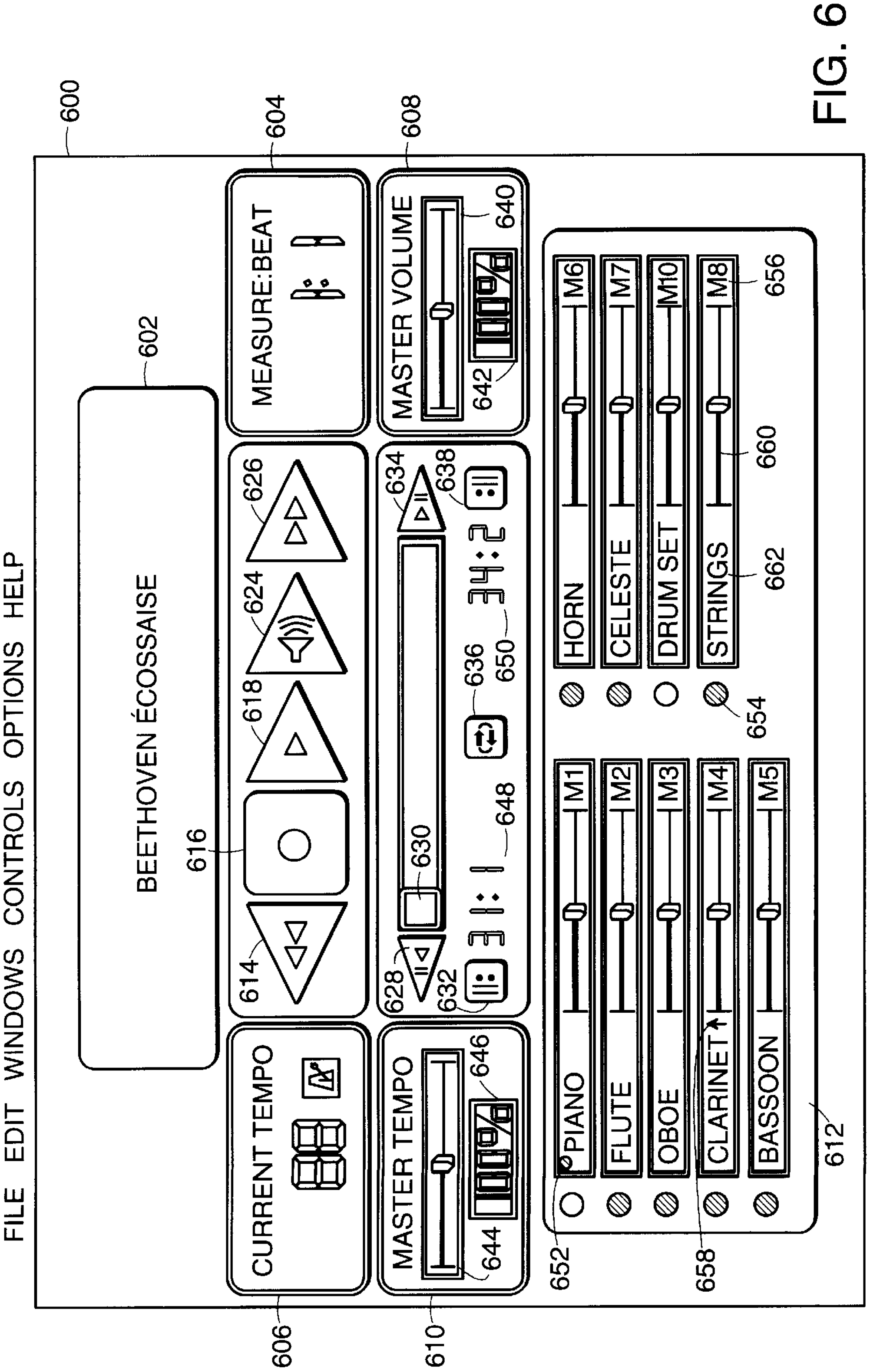
FIG. 6 is a screen display of an embodiment of the apparatus.

Referring now to FIG. 6, a screen display 600 of an embodiment of the apparatus implemented as software executing on a general-purpose computer is shown. In brief overview, the screen display 600 provides six general categories of information: a title display 602 which displays a name associated with the file representing the accompaniment score; a Measure:Beat indicator 604 which displays the measure and beat location in the accompaniment score at which the apparatus is positioned; a Current Tempo indicator 606 which indicates the current speed of accompaniment output; a Master Volume indicator 608 which displays the relative volume level at which the accompaniment score is output; a Master Tempo indicator 610 displaying the relative speed at which the accompaniment is output; and a MIDI track display 612 which displays one or more indicators representing MIDI tracks available for rendering the accompaniment score. The screen display 600 also provides various controls 614, 616, 618, 624, 626, 628, 630, 632, 634, 636, 638 for controlling the apparatus. The apparatus shown in FIG. 6 may be rendered on any general-purpose computer using a common operating system such as MacOS, manufactured by Apple Computer of Cupertino, California, or Microsoft WINDOWS, manufactured by Microsoft Corporation of Redmond, Wash.

In greater detail, the title indicator 602 displays information which identifies the accompaniment file currently being used by the apparatus. The title indicator 602 may display information in an alphanumeric format, as shown, or the title indicator may display graphical information associated with the accompaniment file. The information displayed by the title indicator 602 may be entered by a user of the apparatus or, alternatively, the title indicator 602 may display the actual name of the file representing the accompaniment score.

The Measure:Beat indicator 604 provides an indication of the location in the accompaniment score that the apparatus is playing or will begin playing. For example, the Measure:Beat indicator 604 depicted in FIG. 6 indicates that the apparatus is currently at the first beat of the first measure of the file "Beethoven Ecossaise." The Measure:Beat indicator 604 may provide location information alphanumerically, as shown in FIG. 6, or it may provide such an indication auditorially. For example, the apparatus could provide measure and beat location as verbal indications during performance input to help the soloist keep track of location in the score. Alternatively, the Measure:Beat indicator 604 may be a visual display such as a dial having a sweep indicator which begins from a starting position and rotates within the dial to indicate position within the accompaniment score graphically. Referring back to FIG. 2, step 208, the apparatus makes real-time determinations of the performer's location in the score. In some embodiments, the current measure and beat can be stored in one or more data structures and the content of those one or more data structures is used to output measure and beat location information.

The Current Tempo indicator 606 displays the speed with which the accompaniment score is output. When the apparatus is simply playing back the accompaniment score and is not following a input performance, the tempo displayed by the Current Tempo indicator 606 will be equal to the tempo specified for the accompaniment score in the accompaniment file. The Current Tempo indicator 606 may provide tempo in units of beats per minute; for example, in FIG. 6 the Current Tempo indicator 606 indicates that the accompaniment score is rendered at 88 beats per minute. Although beats per minute are the preferred units for display, other units indicating speed of performance may be used. The Current Tempo indicator 606 may display tempo in alphanumeric format, as shown in FIG. 6, or it may display such information graphically. For example, the Current Tempo indicator 606 may be provided as a semicircular dial. A needle indicator could be provided which would change its position based on the speed with which the apparatus renders the accompaniment score. For example, as playback speeds up or slows down, the needle could adjust its position on the dial in much the same way as a speedometer needle functions. For the embodiment shown in FIG. 6, tempo information may be output directly from a data structure in which tempo is stored on the apparatus may convert Relative Tempo "on the fly" in order to display tempo information. In the latter case, the apparatus would multiply Relative Tempo by the tempo specified in the file to arrive at a value for the current tempo.

The Master Volume indicator 608 indicates the relative volume at which the musical piece represented by the accompaniment file is played. For example, FIG. 6 displays a Master Volume indicator 608 indicating that the accompaniment score is or will be played at 100 percent of the volume specified for the score in the corresponding file. The Master Volume indicator 608 can be provided with a slider control 640 allowing the playback volume to be gradually increased or decreased by pulling or pushing the slider 640. The playback volume may also be adjusted by typing directly into the text indicator field 642. To do so, the text indicator field 642 is selected using well-known techniques associated with graphical user interfaces. The new volume may then be typed in to the indicator field 642. As described above with respect to the Measure:Beat indicator 604 and the Current Tempo indicator 606, the Master Volume indicator 608 may display information graphically or alphanumerically.

To generate volume information, performance input signals should include information identifying the volume at which the performance is rendered. For example, if the performance input is rendered as a string of MIDI events, each "note-on" event should also include "key velocity" information. Such information would indicate how "hard" a "key" is struck. A "key" struck harder results in a louder than normal performance input. The apparatus can use the "key velocity" information to calculate a value for relative volume.

The Master Tempo indicator 610 indicates the relative speed with which the apparatus renders the accompaniment score. As noted above with respect to the Master Volume indicator 608, the Master Tempo indicator 610 may include a slider switch 644 and generally includes a text indicator field 646. The text indicator field 646 displays the relative tempo at which the accompaniment is provided for the entire piece. For example, if an accompaniment score is intended to be provided at 80 beats per minute and the master tempo is set to 110 percent, the apparatus will render the accompaniment score at 88 beats per minute. The relative tempo may be gradually adjusted by pushing or pulling the slider 644. As the accompaniment speeds up or slows down to follow a performance input by a soloist, the relative tempo indicated in the text indicator field 646 changes dynamically to reflect changes in the tempo of the performance input. The Master Tempo indicator 610 can display information directly from a data structure which stores Relative Tempo, if Relative Tempo is stored or a percentage value. For the embodiment described previously, Relative Tempo could be multiplied by 100 to convert it to a percentage.

As shown in FIG. 6, the main screen of the apparatus may also provide a MIDI track display 612. In the embodiment shown in FIG. 6, the MIDI track display 612 displays information associated with each MIDI track in grouped fashion. Each group includes an identification of the MIDI output port for which it is displaying information 656, a play indicator 654 which indicates that the corresponding MIDI track is used to render the accompaniment score, a following indicator 652 which indicates which MIDI track of the accompaniment score is being performed, a transposition indicator 658 displaying whether the output of the MIDI track is transposed from the accompaniment score, and a volume indicator 660 which indicates the volume at which the MIDI channel is reproduced. The volume indicator 660 can be provided as a slider control, allowing the volume to be changed by pushing or pulling the slider and simultaneously providing a graphical indicator of the volume level for the corresponding MIDI track. Each group also includes a name 662 associated with the MIDI track. The name information may be provided by a user of the apparatus or the names may be derived from the file representing the accompaniment score. The number of MIDI tracks displayed in the MIDI track display 612 can be derived from the file representing the accompaniment score. For example, if the file representing the accompaniment's score is a MIDI file, each MIDI track will be represented as an individual group of information. Alternatively, a master list of MIDI tracks may be provided to a user of the apparatus and the user may select individual MIDI tracks which are displayed in the MIDI track display 612.

Volume displays for each track may also include an alphanumeric display corresponding to the relative position of the slider control, e.g., "85%". Similarly, each transposition indicator 658 may also include an alphanumeric portion indicating the exact number of half-steps by which the corresponding track is transposed. Volume and transposition information can be directly output, from memory storage, and such information may be received by the apparatus using menu choices or dialog boxes, as described below.

The screen display 600 may also provide a number of controls for the apparatus. For example, a rewind control 614 may allow the apparatus to be set to the first beat of the first measure or it may be configured to continuously scan backwards through the accompaniment score. Similarly, a forward control 626 may be provided which may either set the apparatus to the final beat of the final measure of the accompaniment score or it may be configured to scan forward continuously through the accompaniment score. A stop control 116 may be provided to stop playback of the accompaniment score. A preview control 624 may also be provided which allows the apparatus to "preview" the accompaniment score, that is, to play a predetermined number of measures of the accompaniment score that immediately follow the position of the apparatus in the score. This allows the apparatus to be set to a particular measure and beat of an accompaniment piece and to remind a user of the apparatus of the sound of the accompaniment score following that point.

A play control 618 can also be provided. The play control 618 may be configured to simply play the accompaniment score that is currently loaded by the apparatus, to play a recorded performance, or to play the accompaniment score while following a performance input. In embodiments of the apparatus in which only one play control 618 is provided, a user may signal to the apparatus which type of playback is requested by an external means, for example, left mouse button may mean play and right mouse button may mean play while following. Alternatively, a modifier key could be held down on a associated keyboard, indicating which type of playback is desired. In other embodiments multiple play controls may be provided which indicate different play functions.

A second set of controls may be provided by the screen display 600 to allow the apparatus to be positioned at a particular point in the accompaniment score or to instruct the apparatus to loop a particular portion of the accompaniment score. A thumbnail 630 may be provided within a progress bar. The thumbnail 630 may move along the progress bar while the apparatus plays the accompaniment file, thereby providing a graphical indication of the apparatus' position within the accompaniment file during playback. The thumbnail 630 may also be used to position the apparatus at a particular point in the accompaniment score. For example, if a user desires to position the apparatus at the third beat of the twentieth measure of an accompaniment score, the user may drag the thumbnail 630 along the progress bar until the Measure:Beat indicator 604 indicates that the apparatus is positioned at the third beat of the twentieth measure of the piece. A reverse control 628 and a forward control 634 can also be provided to allow the user to quickly position the apparatus within the accompaniment score. For example, the controls may be configured to skip to the beginning of the next or previous measure, or they may be configured to skip to the next (or preceding) point in the accompaniment score indicated by the user to be of particular interest.

Looping controls include a start loop control 632, a start loop indicator 648, an end loop control 638, an end loop indicator 650, and a loop on/off control 636. The start loop control 632 marks a particular beat and measure of an accompaniment score as the beginning of a loop and the end loop control 638 sets a beat and measure of the accompaniment score as the end of a loop. The beginning and end of a loop are indicated by the start loop indicator 648 and the end loop indicator 650. Fox example, in the embodiment shown in FIG. 6, a loop has been constructed that begins at the first beat of the thirty-first measure of "Beethoven Ecossaise" and ends at the second beat of the thirty-fourth measure of that accompaniment score. The user indicates a desire to have the apparatus repeatedly play the accompaniment score from the start loop to the end loop point by activating the loop control 636. Loop control may be useful for allowing a musician to define a particularly difficult passage of a piece which requires many repetitions of practice to play properly.

Figure 7A:
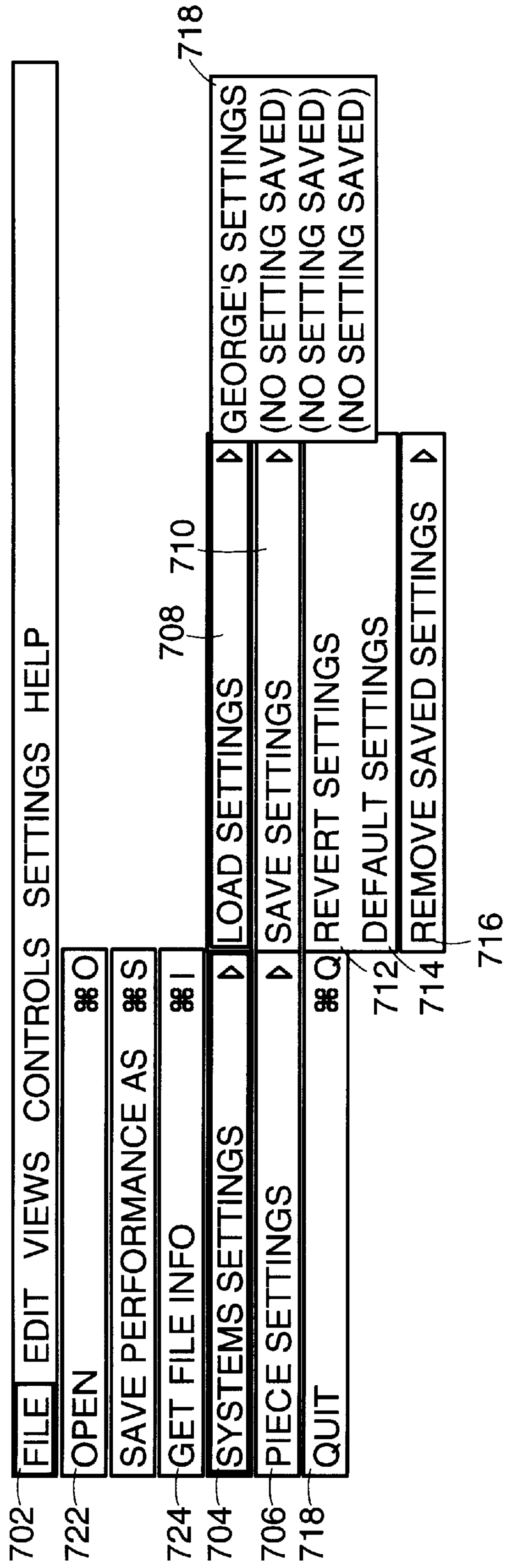
FIG. 7A is a screen display of an embodiment of the invention showing the File menu and the System Settings Submenu selected.

The apparatus provides a capability to load and save the settings entered by a user. For example, in the embodiment shown in FIG. 7A, a File menu 702 is provided which has submenus entitled System Settings 704 and Piece Settings 706. As shown in FIG. 7A, the System Settings submenu 704 has further choices: a Load Setting submenu 708, a Saved Settings submenu 710, a Revert Settings command 712, a Default Settings command 714 and a Removed Saved Settings submenu 716. The Load Setting submenu 708 allows a user to load system settings. The system settings to be loaded may be stored in a separate file. For example, in the embodiment shown in FIG. 7A, a file called George's Settings 718 will be accessed to load various system settings. Similarly, if a user has changed the settings on the apparatus, those setting may be saved by selecting the Saved Setting submenu and either replacing a currently existing file or creating a new file containing the settings.

Figure 7B:
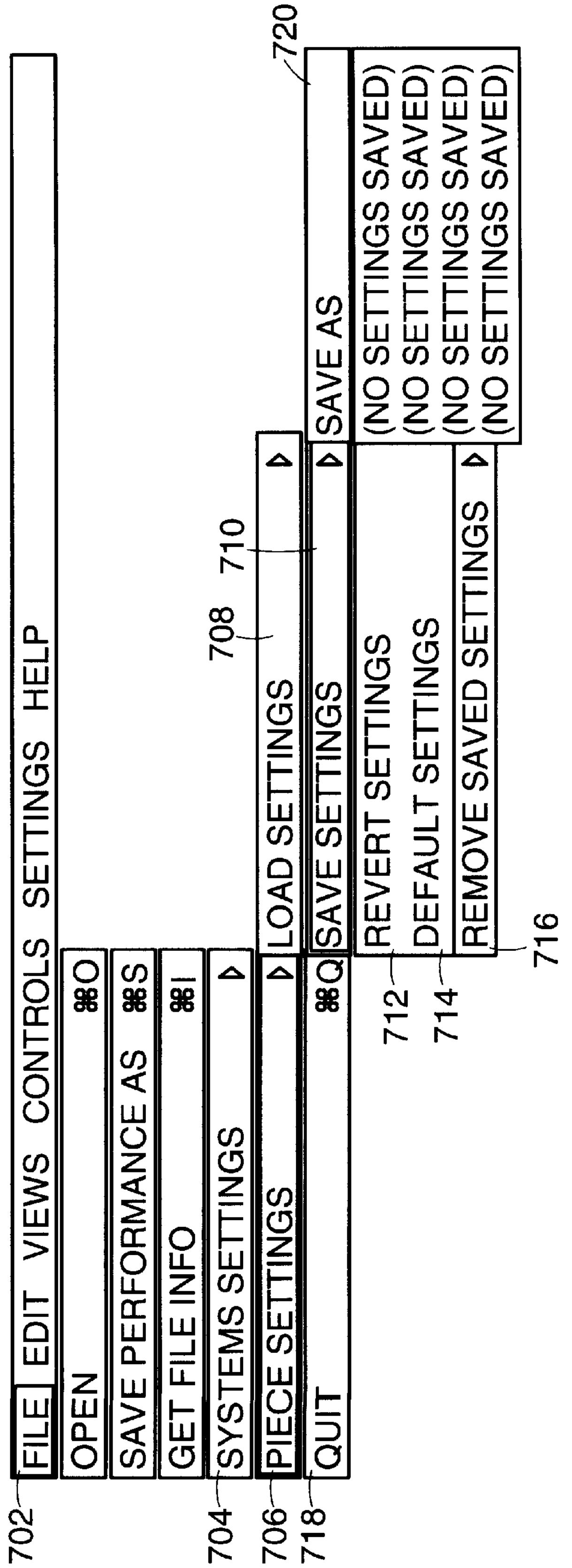
FIG. 7B is a screen display of an embodiment of the invention showing the File menu selected in the Piece Settings Submenu.

For example, as shown in FIG. 7B, a settings file may be saved using the Save As command 720 in the Save Settings submenu 710. When the Save As command 720 is selected, the user will be prompted to enter an identifier for the settings file and the identifier provided by the user will appear as a selection for the Load Settings submenu 708. The Revert Settings command 712 is used to return the apparatus to a series of settings which existed before they were changed by the user during a session. The Default Settings command 714 resets the apparatus to default settings. The Removed Saved Settings submenu 716 allows a user to prune the number of settings present for the apparatus and to delete old or unused settings. The Piece Settings menu 706 has similar submenus and commands which operate in the same manner, however, the settings files associated with the Piece Settings menu 706 are associated with a particular accompaniment file. So, for example, two separate users of the apparatus may have different settings for the same musical piece represented by an accompaniment file. The Piece Settings menu and its associated submenus would allow those users to load and save their individual settings without affecting the other users' settings. Piece settings may be saved as a separate file, in the file associated with the accompaniment score, or, in some embodiments, piece settings may be saved in a manufacturer-specific location of the file associated with the accompaniment score. The File menu also includes a Quit command which quits the program, that is, it turns off the apparatus.

Figure 12:
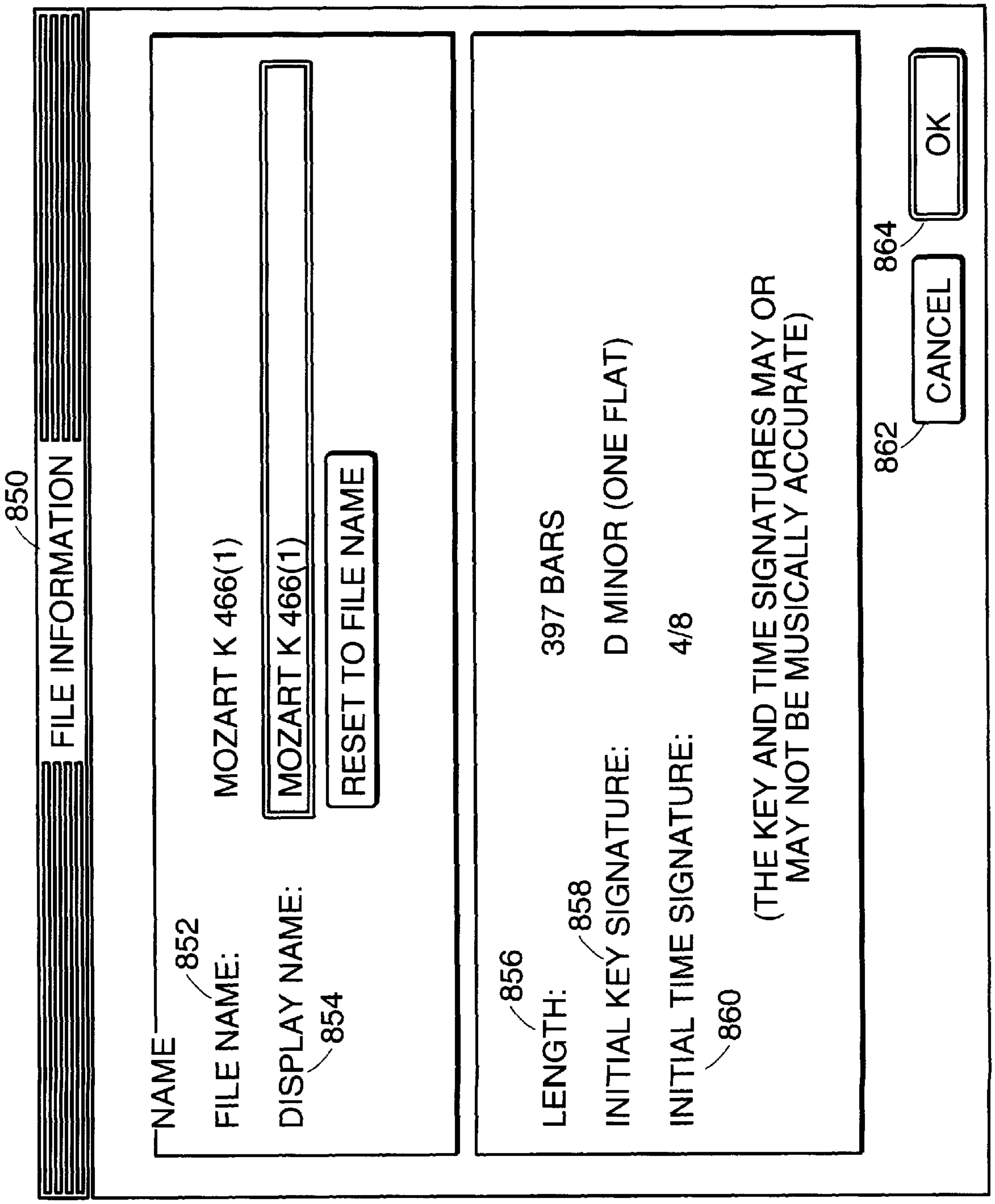
FIG. 12 is a screen display of an embodiment of the apparatus showing the File Information dialog box.

Referring again to FIG. 7A, the File menu 702 also provides an Open command 722 and a Get File Info command 724. The Open command 722 is used to select an accompaniment file for use by the apparatus. The Get File Info command 724 displays a dialog box containing information about the accompaniment score, such as the name of the file corresponding to the score, the name associated with the score by the user, the length of the musical score, and other information. For example, FIG. 12 shows an embodiment of the file information display which also includes information related to the initial key signature of the musical score represented by the accompaniment file and information related to the initial time signature of the musical score represented by the accompaniment file.

Figure 8:
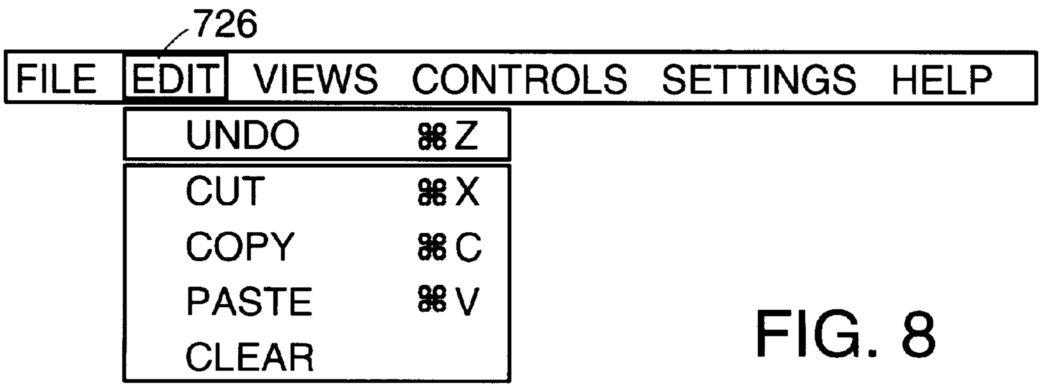
FIG. 8 is a screen display of an embodiment of the apparatus showing the Edit menu selected.

The apparatus may also be provided with an Edit menu 726 depicted in FIG. 8, which provides well known edit commands such as Copy, Paste, and Undo. These commands allow information to be copied and pasted between indicators on the main screen and also in the dialog boxes, which will be discussed below.

Figure 9:
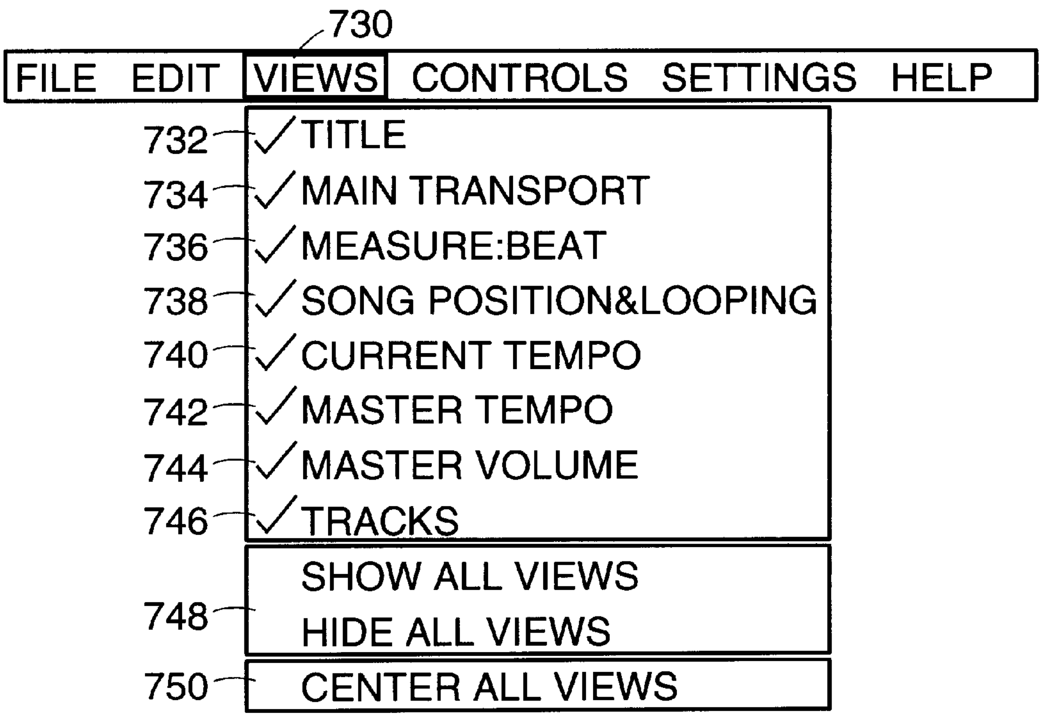
FIG. 9 is a screen display of an embodiment of the apparatus showing the Views menu selected.

FIG. 9 depicts an embodiment of the apparatus providing a Views menu 730. In the embodiment shown in FIG. 9 the Views menu includes several selections: Title 732; Main Transport 734; Measure Colon Beat 736; Song Position and Looping 738; Current Tempo 740; Master Tempo 742; Master Volume 744; and Tracks 746. Each one of these selections allows the apparatus to be customized to display or not display the main display item associated with the selection. For example, selecting the Title selection 732 toggles whether the title indicator 602 is displayed on the screen display 600. Similarly, selecting any of the other selections results in toggling whether or not the screen display element associated with the selection is displayed on the screen display 600. For example, selecting Tracks 746 would result in the apparatus not displaying the MIDI track display 612. The Views menu 730 may also include a Hide All Views command 748 and a Center All Views command 750. When selected, the Hide All Views command 748 moves all of the main screen items to the background of the screen display 600 so that they are not visible. The Center All Views command 750 centers the items displayed on the screen display 100. This allows displayed items to be re-centered after their position has been changed by a user.

Figure 10:
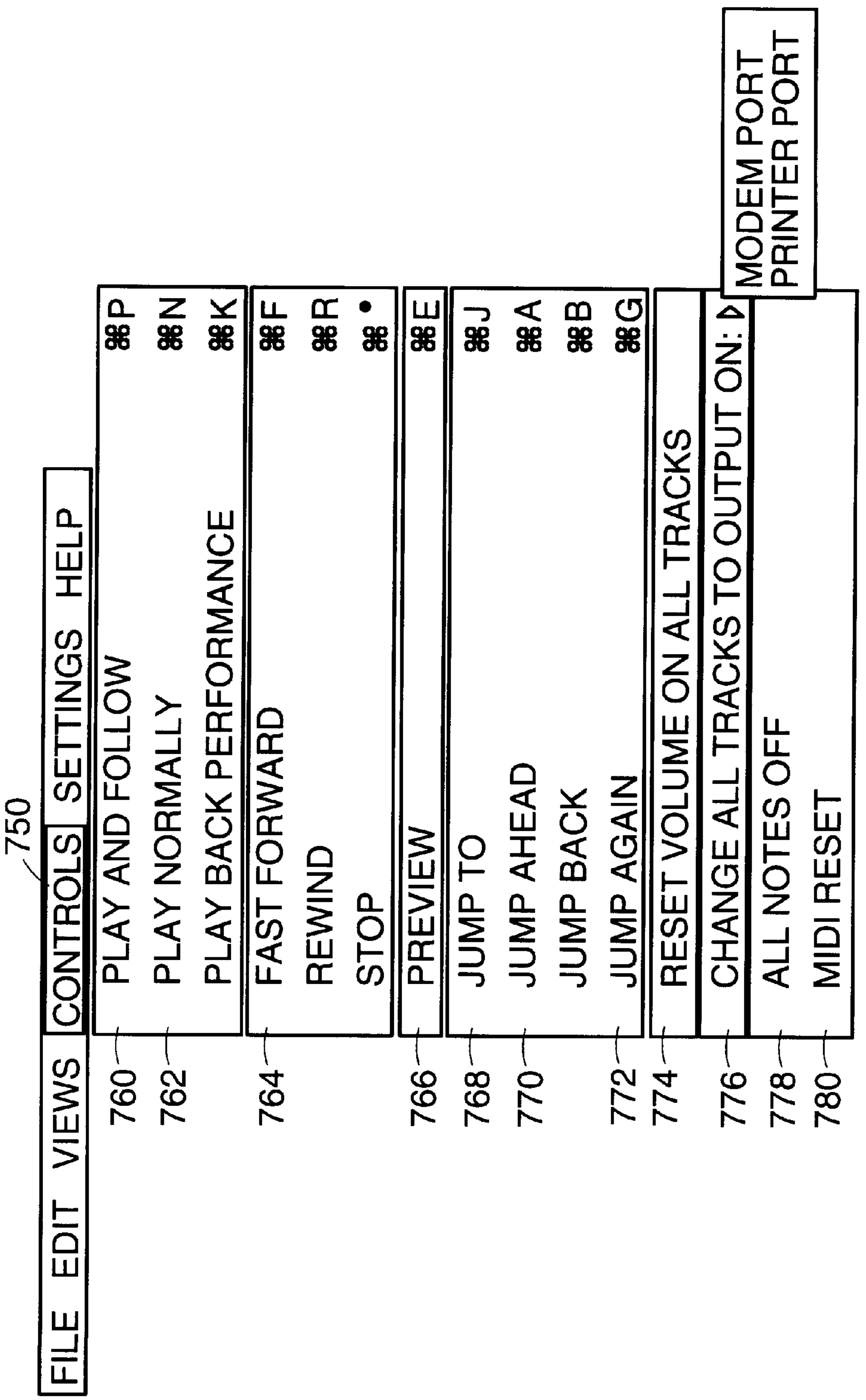
FIG. 10 is a screen display of an embodiment of the apparatus showing the Controls menu and the Change All Tracks To Output On: Submenu selected.

FIG. 10 is a screen display showing the Controls menu 758. The Controls menu 758 allows a user to instruct the apparatus to play the accompaniment score while following a performance input by selecting the Play And Follow command 760. The Play and Follow command 760 causes the apparatus to follow a performance input using the settings entered in the Following dialog box, discussed below. This command has the same effect as pressing the play control 618 (with appropriate modifier key, if necessary) on the screen display 600. A user may also command the apparatus to simply play the accompaniment file, without following a soloist, by selecting the Play Normally command 762. Selecting this command has the same effect as pressing the play button 618 on the screen display 600. The user may instruct the apparatus to fast forward through the accompaniment score by selecting the Fast Forward command 764. This command corresponds to activating the forward control 626, shown in FIG. 6.

Similarly, the user may instruct the apparatus to play a portion of the accompaniment score by selecting the Preview command 766. This menu selection corresponds to activating the preview control 624, shown in FIG. 6. The user may alter the position of the apparatus in the accompaniment score by selecting either the Jump To command 768 or the Jump Ahead command 770. In some embodiments, the Jump Ahead command 770 corresponds to the forward control 634, shown in FIG. 6, and causes the apparatus to jump ahead to the next rehearsal point for the accompaniment score defined by the user in the Special Beats dialog box, discussed below. In other embodiments, the Jump Ahead command 770 causes the apparatus to move forward in the accompaniment score by a predetermined amount. In still other embodiments, the Jump Ahead command 770 may scroll forward in the accompaniment score, which is equivalent to dragging the thumbnail 630 through the progress bar. In some embodiments, the Jump To command 768 allows the user to specify exactly where in the accompaniment score the apparatus should position itself. Selection of this command causes the Location dialog box to be displayed, discussed below. The Controls menu may provide a Jump Again command 772 which instructs the apparatus to return to the position in the accompaniment score to which its last jump was made. So, for example, if the apparatus jumped to the fiftieth measure of the accompaniment score and then continued playing for a few measures, the Jump Again command 772 would cause the apparatus to return to the fiftieth measure of the accompaniment score.

The Controls menu 758 may also provide other commands for controlling the apparatus. In the embodiment shown in FIG. 10, the Controls menu 758 includes a Reset Volume On All Tracks command 775, a Change All Tracks To Output On: command 776, an All Notes Off command 778, and a MIDI Reset command 780. The Reset Volume On All Tracks command 774 causes the volume level on all tracks to be reset to the volume levels specified in the file associated with the accompaniment score. Selecting this command is equivalent to double-clicking each individual slider control in the MIDI track display 612 of the screen display 600. The Change All Tracks To Output On: command 776 allows the output port for individual MIDI tracks to be selected. In the embodiment shown in FIG. 10, a further submenu is provided which allows the modem port to be selected. Other choices which may be provided include serial port, parallel port, SCSI port, joystick port, internal sound card port, internal software synthesizer resident in the apparatus, or Apple Desktop Bus port. Selection of this command is equivalent to setting the output port in the Track dialog box, discussed below. The All Notes Off command 778 instructs all associate MIDI instruments to stop playing notes. This is useful in the event that one or more instruments "hang," producing a continuous tone. The MIDI reset command issues a reset command to a MIDI tone generator connected to the apparatus.

Figure 11:
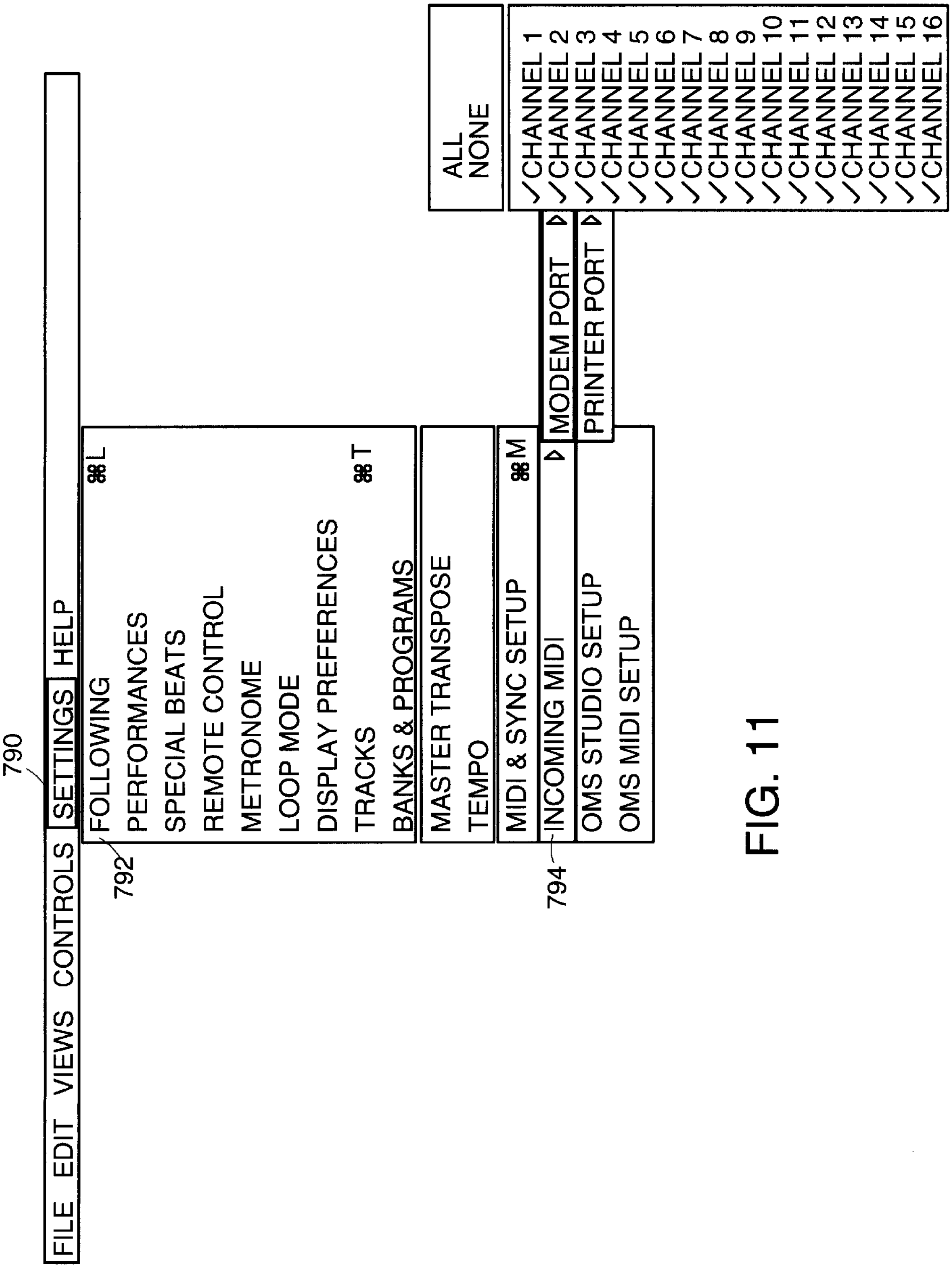
FIG. 11 is a screen display of an embodiment of the apparatus showing the Settings menu, the Incoming MIDI Submenu, and the Modem Port Submenu selected.

FIG. 11 depicts an embodiment of the apparatus providing a Settings menu 790. The Settings menu 790 depicted in FIG. 11 provides a number of commands that can be selected. Each one of the commands in the Settings menu 790 provides access to an information entry screen, or dialog box, associated with the choice. For example, selecting the Following choice 792 underneath the Settings menu 790 results in display of the dialog box depicted in FIG. 14. Each of the dialog boxes will be discussed below in greater detail. Information entered in the various dialog boxes may be saved in a separate file, in the file associated with the accompaniment score, or it may be saved in a manufacturer-specific portion of the file associated with the accompaniment score. In the embodiment depicted in FIG. 12, the Settings menu 790 provides an Incoming MIDI command 794. The Incoming MIDI command can be used to accept MIDI input from all, none, or selected channels for a particular MIDI port. In the embodiment shown in FIG. 11, MIDI input is accepted from Channels 1–16 of the MIDI port attached to the modem port of the apparatus.

FIG. 12 depicts an embodiment of the File Information dialog box 850 which displays the name of the file associated with the accompaniment piece 852, the name associated with the file 854, the length of the musical piece 856, the initial key signature of the musical piece 858 and the initial time signature of the musical piece 860. The File Information display 850 may be accessed by selecting the Get File Info command 724 in the file menu 702, typing a keyboard shortcut associated with the Get File Info command 724 (for example, command-I in FIG. 7A) or by double-clicking on the title indicator 602 displayed by the screen display 600. Once the File Information dialog box 850 is displayed, the name associated with the file may be changed by typing a desired name into the display name field. The name may be physically typed into this field or one or more of the editing commands contained in the Edit menu 726 may be used to paste text into the field. Once a user is finished with the File Information dialog box 850 it may be closed by clicking either on the cancel button 862 or the OK button 864. In this dialog box and in others discussed below, clicking on either one of those buttons results in the closure of the dialog box. Clicking the cancel button 862 rejects any changes made to the information in the dialog box and clicking on the OK button 864 accepts any changes to the information changed in the dialog box.

Figure 13:
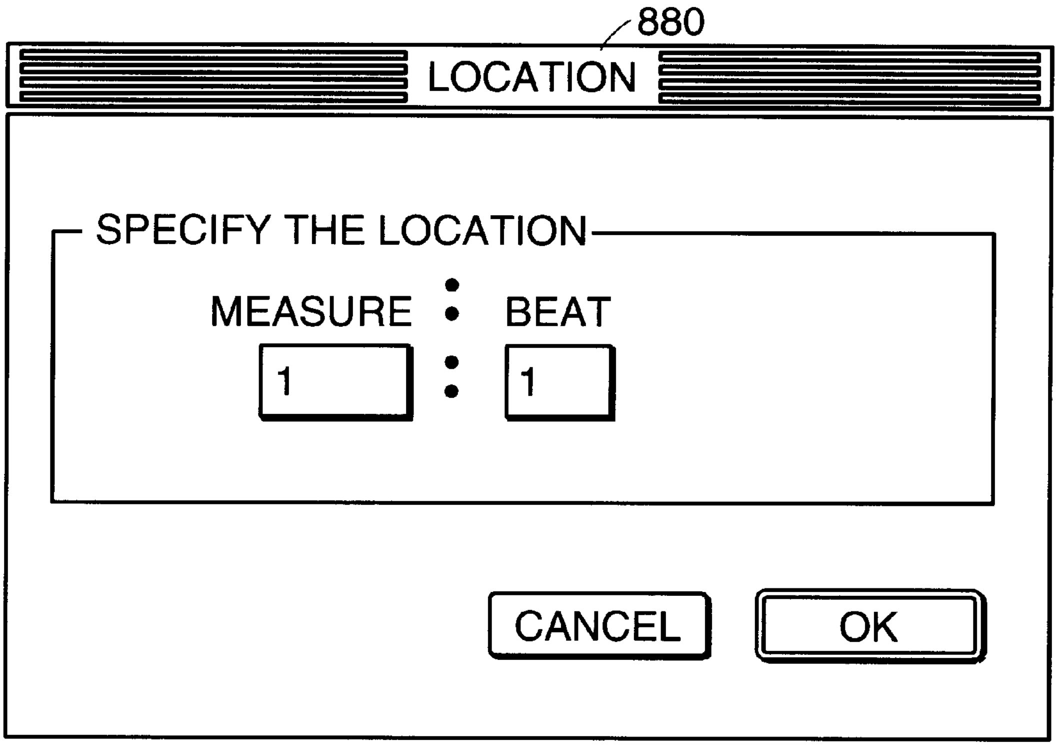
FIG. 13 is a screen display of an embodiment of the apparatus showing the Location dialog box.

FIG. 13 depicts an embodiment of a Location dialog box 880 which allows a user to specify a particular measure and beat to which the apparatus should position itself. The Location dialog box may be accessed by selecting the Jump To command 768 from the Controls menu 758 or double-clicking on the thumbnail 630 on the screen display 600. Once displayed, information may be typed into the measure and beat entry fields of the dialog box. Alternatively, one or more of the editing commands provided by the Edit menu 726 may be used to insert information into these fields.

Figure 14:
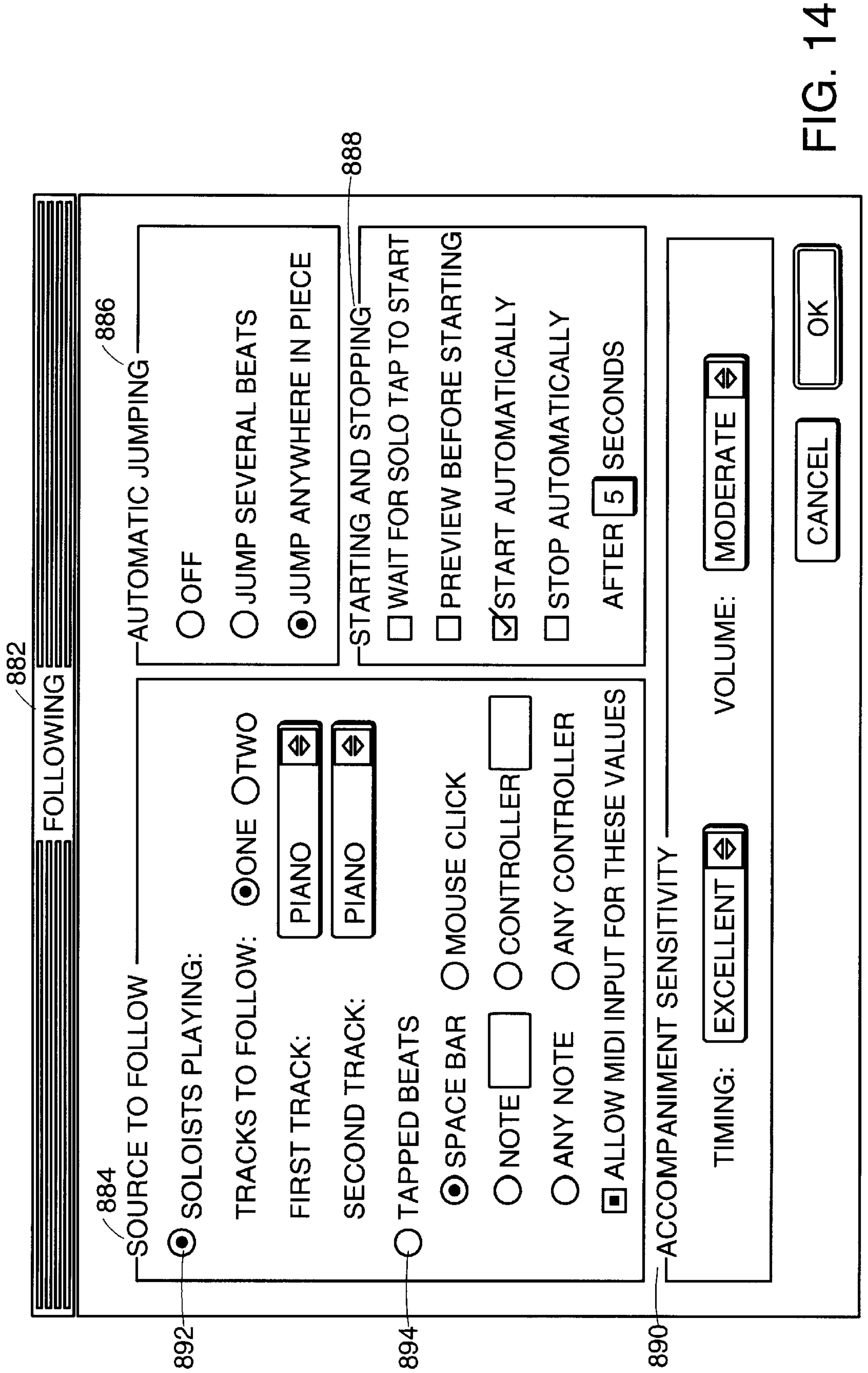
FIG. 14 is a screen display of an embodiment of the apparatus showing the Following dialog box.

FIG. 14 depicts an embodiment of a Following dialog box 882. The Following dialog box 882 may be displayed by selecting the Following command 792 from the Setting menu 790 or by double-clicking on a following indicator 654 in the MIDI track display 612 of the screen display 600. In the embodiment shown in FIG. 14, the Following dialog box 882 provides four general categories of controls: controls for selecting the source of the performance input to follow 884; controls for configuring the automatic jumping feature of the invention 886; controls for configuring starting and stopping of the accompaniment 888; and controls for configuring the sensitivity of the apparatus 890. In greater detail, the controls for identifying the source to follow 884 provide two radio buttons: Soloist's Playing 992 and Tapped Beats 994. If Soloist's Playing 992 is selected, the apparatus will accept a performance input from an instrument and will render the accompaniment score in conformance with settings entered in the sensitivity configuration area 890 when Play And Follow is selected. The apparatus may be configured to follow one or two solo tracks and the track which is provided as the performance input may be selected from a corresponding pop-up menu. If the Tapped Beats radio button 994 is selected, the apparatus accepts a series of beats as the performance input and renders the accompaniment score in conformance with settings entered in the sensitivity configuration area 890 responsively to provided beats when Play And Follow is selected. As shown in FIG. 14, when the Tapped Beats radio button 994 is selected, the user may select the space bar, a mouse click, a representation of a note, a controller, any note, or any controller as the source of tapped beats. The Allow MIDI Input For These Values check box indicates that MIDI input may be used for the note/controller fields.

The controls for configuring the automatic jumping feature 886 of the invention consists of three radio buttons which provide the user with the choices of Off, Jump Several Beats, or Jump Anywhere in Piece. If automatic jumping is off, than the auto jump feature described above will not be implemented by the apparatus. If Jump Several Beats is selected, the auto jump feature will limit relocation of the apparatus. In contrast, if Jump Anywhere in Piece is selected, the auto jump feature will cause the apparatus to relocate to anywhere in the accompaniment score that it perceives a match.

The controls for configuring starting and stopping of the accompaniment 888 may include a series of check boxes as shown in FIG. 14. If the wait for solo/tapped to start check box is checked, than the apparatus will wait for the performance input to begin before continuing with the remainder of the accompaniment score. If Preview Before Starting is checked, the apparatus will play the first few measures of the accompaniment score to remind the performer how the piece sounds. If Start Automatically is checked, and the Play And Follow feature is selected, a soloist may provide performance input corresponding to any location in the score and the apparatus will locate to that position and begin rendering matching accompaniment. If Stop Automatically is checked, then the apparatus stops rendering the accompaniment score once performance input stops. In the embodiment shown in FIG. 14, the Stop Automatically check box has a text input box which allows the performer to specify how long the apparatus provides accompaniment after the performance input stops.

The controls for adjusting the sensitivity of the apparatus 890 consist of two pop-up menus: one for timing; and one for volume. Both pop-up menus allow the user to select from a range of sensitivities and FIG. 14 shows at least two such choices: Excellent; and Moderate. In another embodiment, the pop-up menu associated with accompaniment provides five selections: Excellent; Good; Modest; Negligible; and None. If Excellent is selected, the apparatus will follow the soloist's tempo changes very closely, jump with the soloist to a different part of the accompaniment score responsive to any automatic jumping radio buttons 886 that may be selected, and will observe any Wait For Soloist points indicated in the Special Beats dialog box 960. If Good is selected, the apparatus will follow the performance input in the same manner as if Excellent is selected, except that it will follow the soloist's tempo changes less closely. If Modest is selected, then the apparatus will not follow the soloist's tempo changes at all. If Negligible is selected, the apparatus will not follow the soloist's tempo changes at all and will not jump with the soloist even if one of the automatic jumping radio buttons 886 is selected. If None is selected, the apparatus will ignore the soloist. In this embodiment several volume choices may be associated with the pop-up menu including: High; Moderate; Slight; and None. If High is selected, the apparatus can compare the expected note velocities in the soloist's score with the incoming notes from the soloist. The overall note velocities of the accompaniment score are adjusted to maintain proper volume balance with the soloist. If Moderate is selected, the overall note velocities of the accompaniment parts are adjusted somewhat less. If Slight is selected, the overall note velocities of the accompaniment score are adjusted only slightly. If None is selected, the apparatus ignores note velocity input from the soloist.

Figure 15:
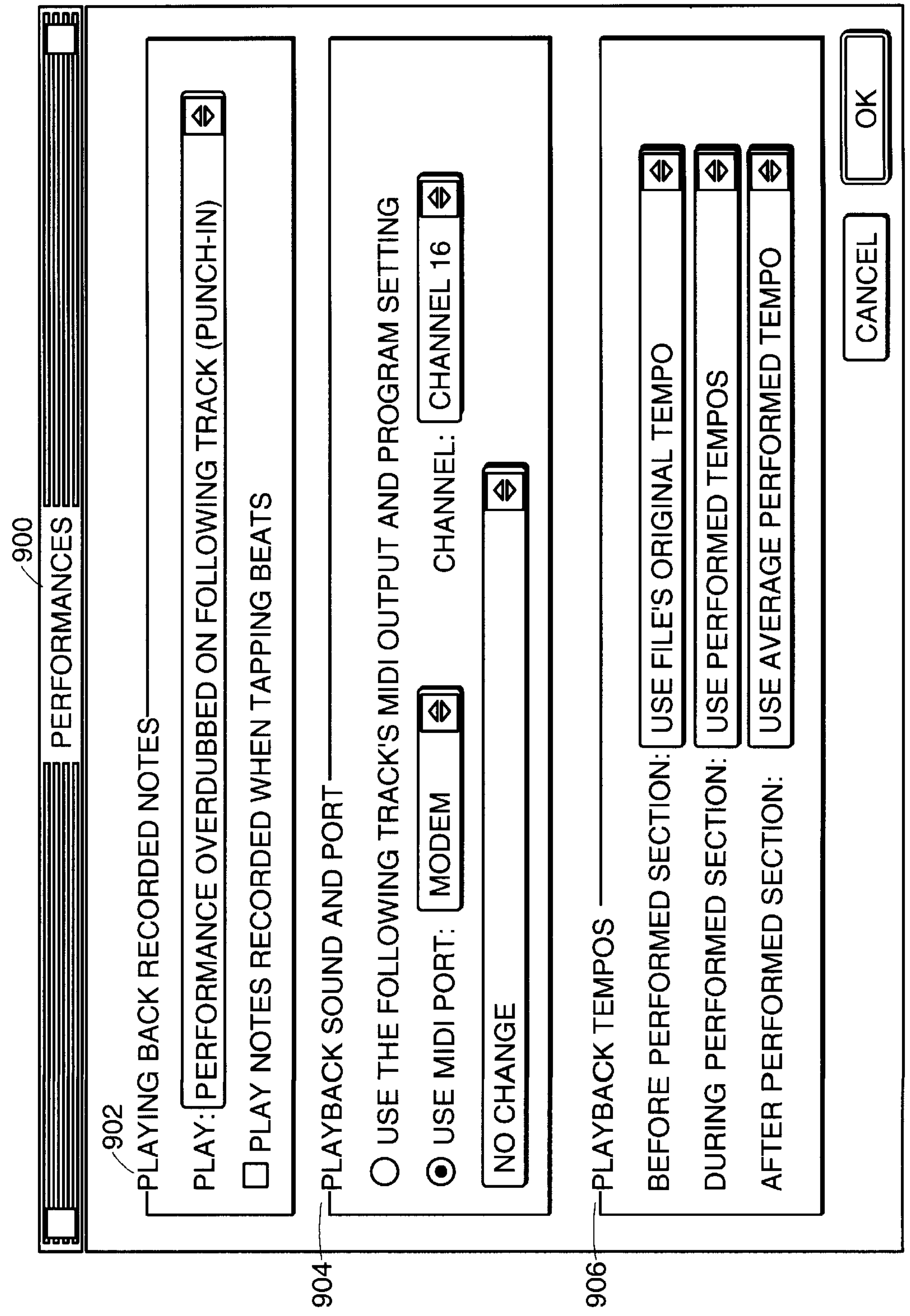
FIG. 15 is a screen display of an embodiment of the apparatus showing the Performances dialog box.

FIG. 15 shows an embodiment of the apparatus displaying a Performances dialog box 900. The Performances dialog box may be accessed by double-clicking on any one of the following indicators 654 displayed in the MIDI track display 612 on the screen display 600 or by selecting the Performances command in the Settings menu 790. The Performances dialog box 900 may include controls for Playing Back Recorded Notes 902, which Playback Sound And Port to Use 904, and for Playback Tempos 906.

Figure 15A:
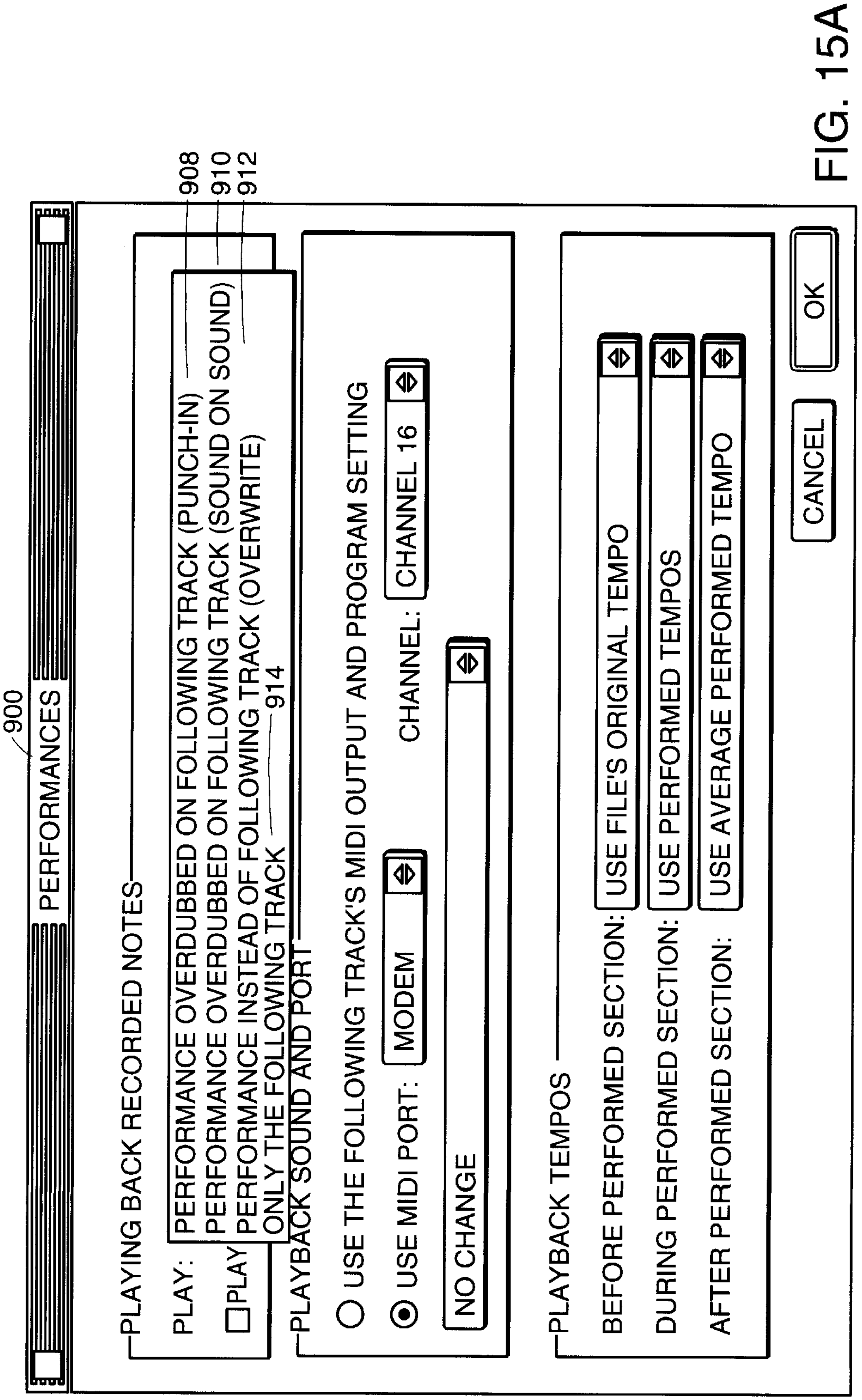
FIG. 15A is a screen display of an embodiment of the apparatus showing the Performances dialog box with the Play pop-up menu selected.

Referring now to FIG. 15A, four choices may be provided for controlling performance playback: Performance Overdubbed On Following Track (Punch In) 908; Performance Overdubbed On Following Track (Sound On Sound) 910; Performance Instead Of Following Track (Overwrite) 912; and Only The Following Track 914. The (Punch In) choice 908 indicates to the apparatus that the original solo score should be played on playback and any notes recorded by the performer during a performance should replace corresponding notes in the soloists score. This allows a performer to play one movement of a piece and playback the entire piece having the performed solo "punched in" on the solo score. The (Sound On Sound) choice 910 indicates to the apparatus that the original solo score should be played on playback and any original polo score input should be overlaid on top of the original solo score. This allows a performer to add to an existing solo track. The (Overwrite) choice 912 accepts performance input and replaces the entire original score with the recorded performance input. This allows a performer to listen to his or her performance after having rendered it. The Only The Following Track choice 914 instructs the apparatus to play the original solo track and none of the notes of the performance. This allows a soloist to keep the notes of the original solo track but play them back at the tempo of the performance input. The Play Notes Recorded When Tapping Beats check box causes the apparatus to record performance input as a new track when the apparatus is following tapped beats. The new recorded track can be played back in addition to the accompaniment and solo score and will be played back at the tempo of the tapped beats.

Figure 15B:
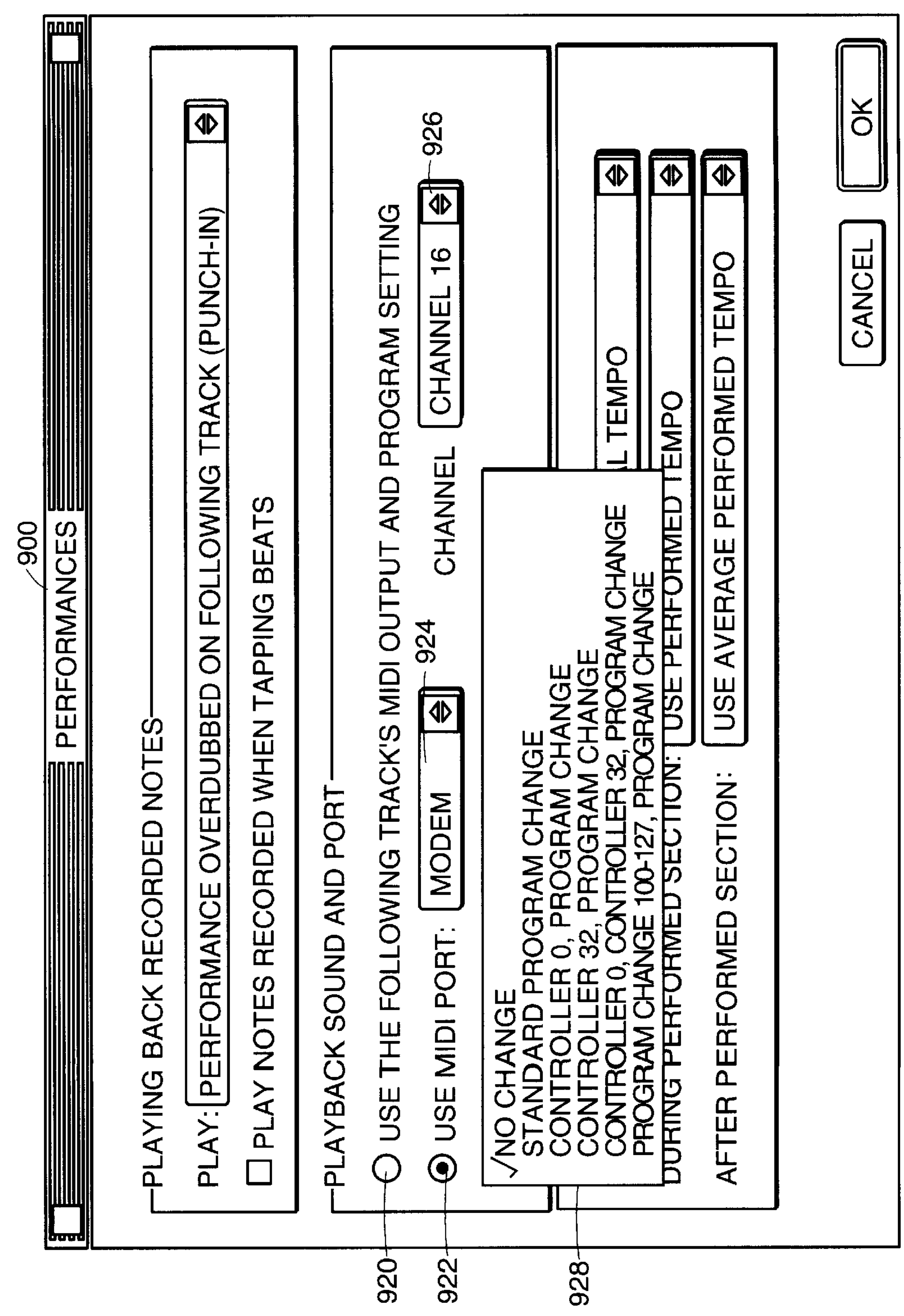
FIG. 15B is a screen display of an embodiment of the apparatus showing the Performances dialog box having the Play-Back Sound and Port pop-up menu selected.

Referring to FIG. 15B, the Playback Sound And Port settings 904 determine various MIDI characteristics for new tracks created during a performance. If the Use The Following Track's MIDI Output And Program Setting radio button 920 is selected, new tracks will use the same MIDI output and program settings as the original solo track. If the Use MIDI Port radio button 922 is selected, new tracks will use MIDI output and program settings specified by the MIDI Port pop-up menu 924, the Channel pop-up menu 926, and the Program Change menu 928.

Figure 15C:
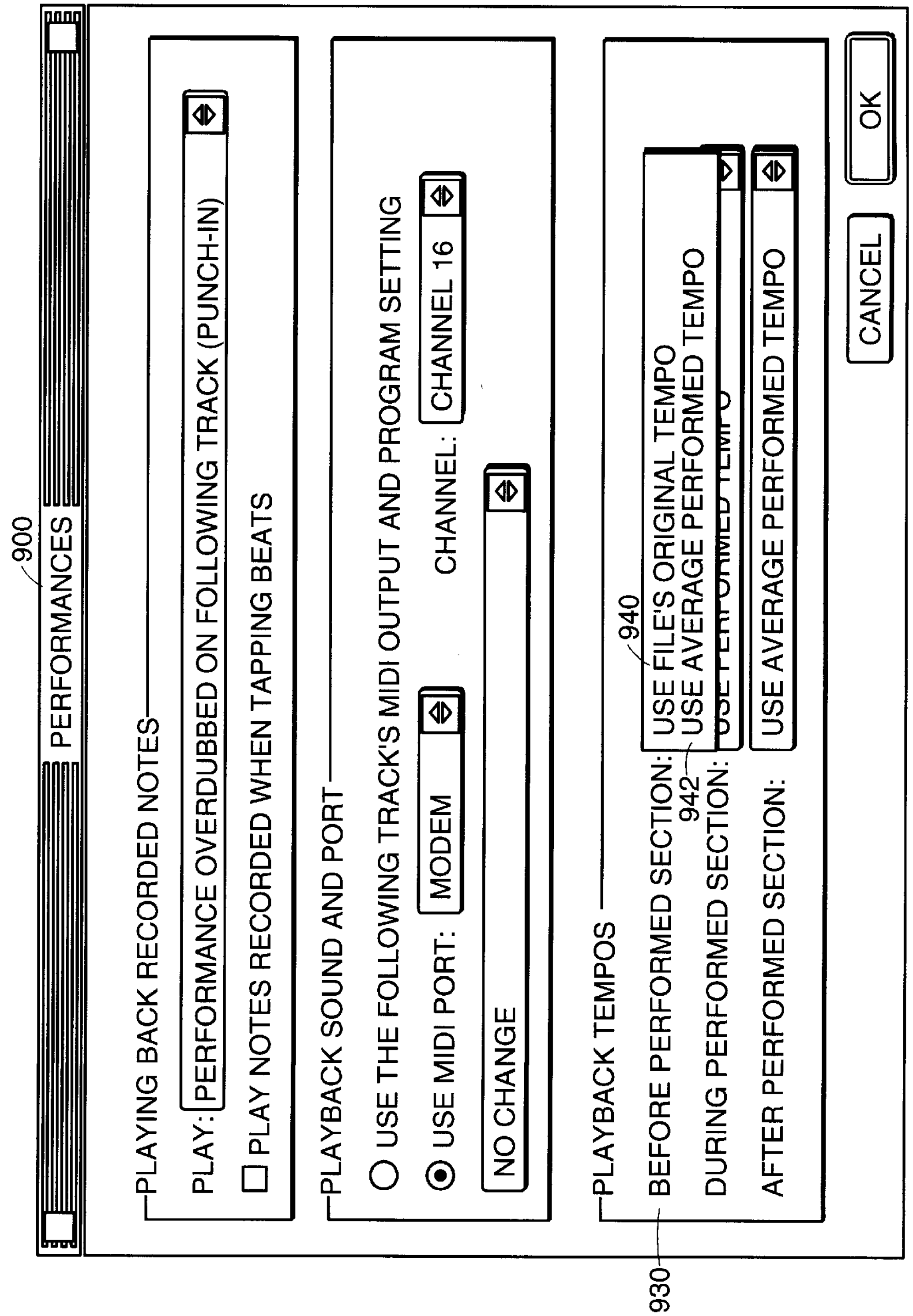
FIG. 15C is a screen display of an embodiment of the apparatus showing the Performances dialog box having the Play-Back Tempos Before Performed Section: pop-up menu selected.

Referring now to FIG. 15C, the choices contained in the pop-up menu associated with the Playback Tempos Before Performed Section: control 930 are shown. The apparatus may be instructed to use the Original Tempo 940 or to use an Average Performed Tempo 942. These choices control how fast a performance is played back. For example, as described above, a performer may perform only part of a piece, and may perform that piece much faster than indicated by the solo score. Upon playback, if the apparatus plays the first portion of a musical piece at the tempo specified in the accompaniment file, a jarring change in tempo will occur when the apparatus begins playing back the performance, which is much faster. Selection of the use Average Performed Tempo choice 942 would allow the expected tempo and the performed tempo to be averaged in order to smooth out playback of the performance. If the Average Performed Tempo choice 942 is selected, the tempo may be a weighted average or straight arithmetic mean.

Figure 15D:
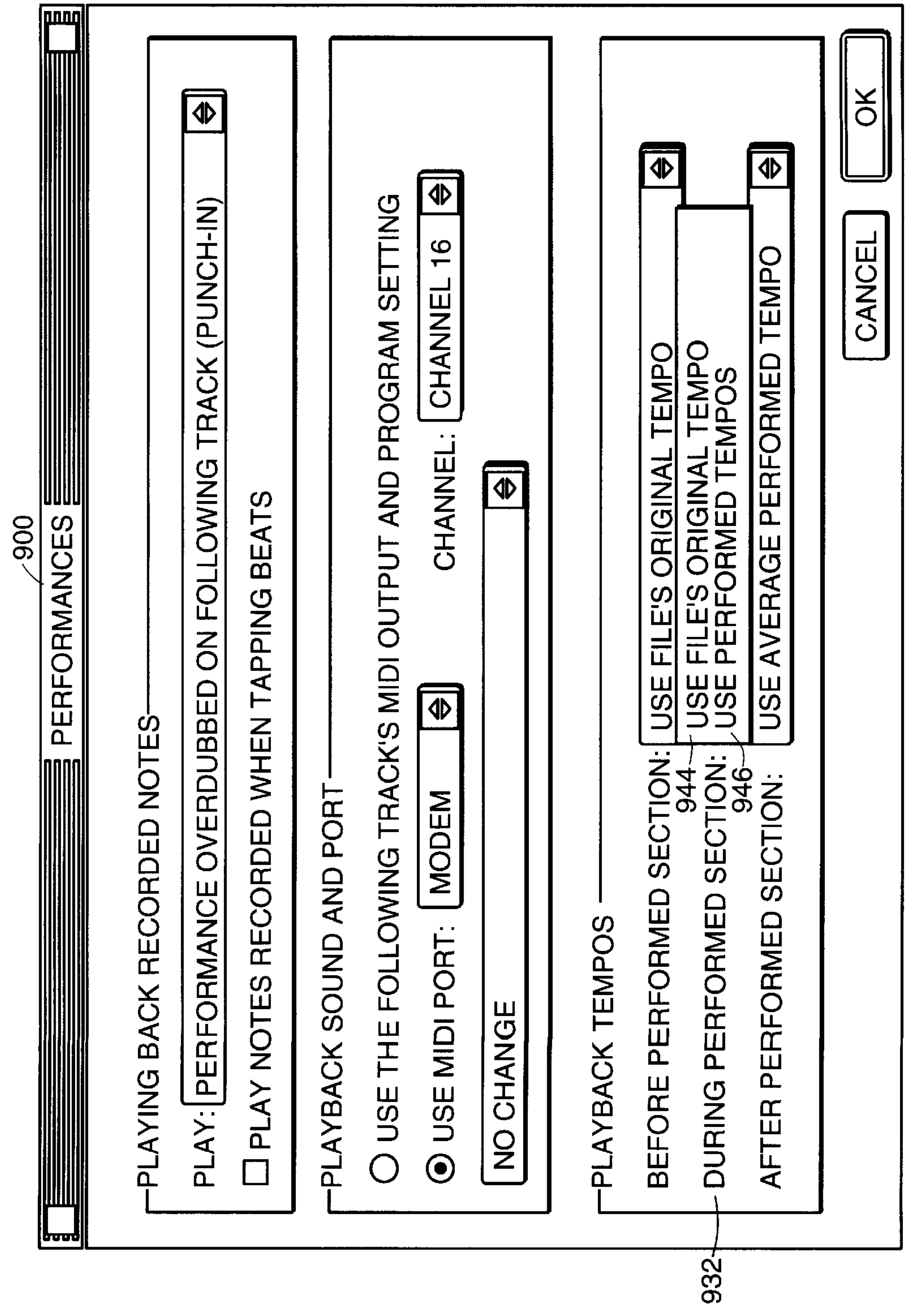
FIG. 15D is a screen display of an embodiment of the apparatus showing the Performances dialog box having the Play-Back Tempos During Performed Section: pop-up menu selected.

FIG. 15D depicts choices available in the pop-up menu associated with the Playback Tempos During Performed Section: control 932. The Original Tempo 944 of the score may be used or Performed Tempos 946 may be used. Selection of the Use Performed Tempos choice 946 causes the apparatus to playback the recorded performance at the tempo at which it was rendered. If the Use File's Original Tempo 944 choice is checked, then the recorded performance is played back using the original tempo indicated by the score. This allows a performance to be played back at the proper tempo using the actual performance input by a soloist.

Figure 15E:
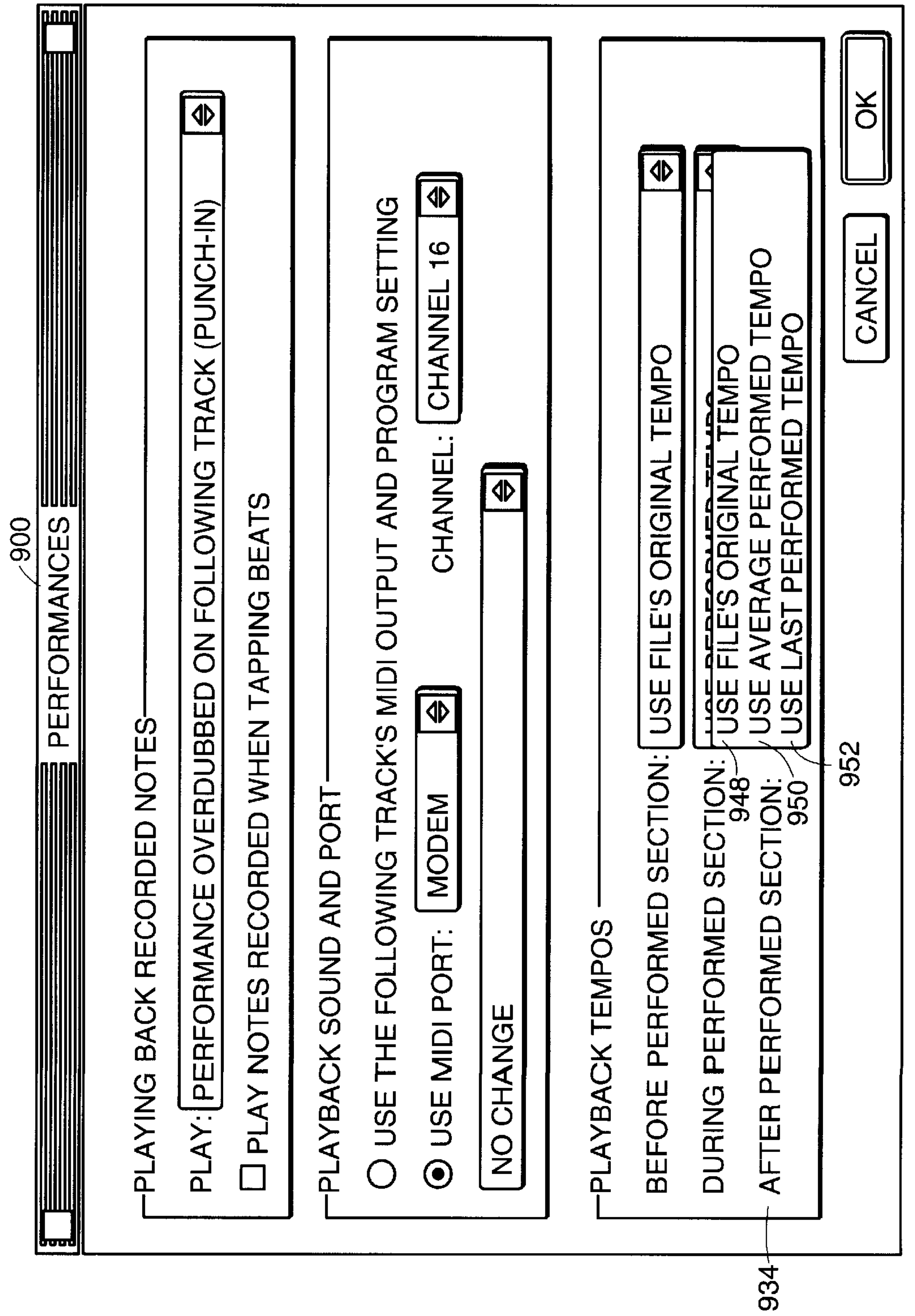
FIG. 15E is a screen display of an embodiment of the apparatus showing the Performances dialog box having the Play-Back Tempos After Performed Section: pop-up menu selected.

Referring now to FIG. 15E, the choices contained in the pop-up menu associated with the Playback Tempos After Performed Section: control 934 are shown. The apparatus may be instructed to Use File's Original Tempo 948; Use Average Tempo 950; or Use Last Performed Tempo 952. Selection of the Use File's Original Tempo choice 948 will cause the apparatus to playback the recorded performance using the tempo indicated for the score. Selection of the Use Average Performed Tempo choice 950 will result in the apparatus averaging the tempo of the performance input and the tempo of the section of the accompaniment score following the performance input in order to avoid an abrupt change in tempo during playback, as described above. Selection of the Use Last Performed Tempo choice 952 will cause the apparatus to playback the accompaniment score at the tempo at which the performance input finished. For example, if a performance input was rendered much faster than expected, then the apparatus will playback the remainder of the accompaniment score at that same faster tempo.

Figure 16:
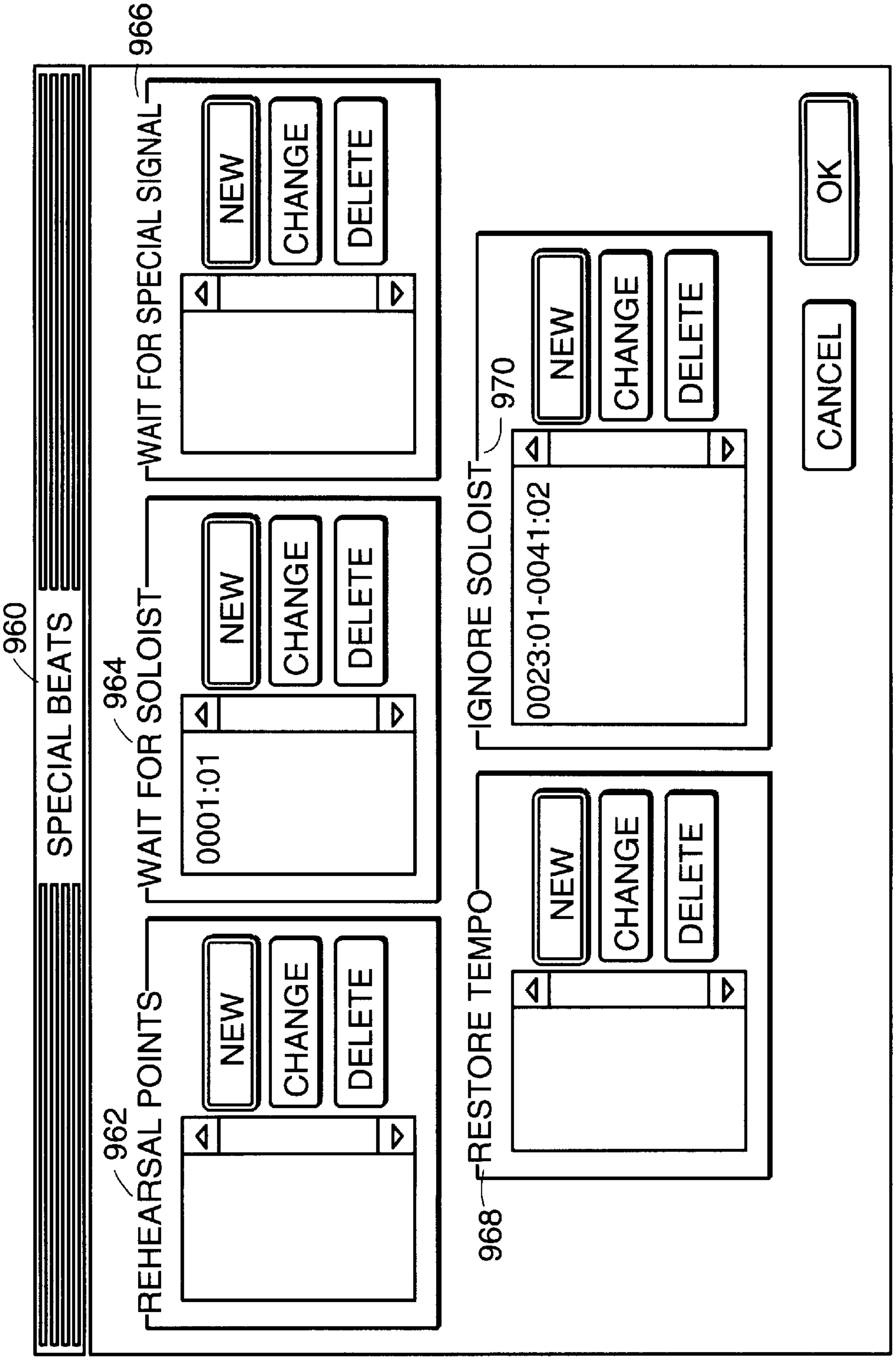
FIG. 16 is a screen display of an embodiment of the apparatus showing the Special Beats dialog box.
Figure 16A:
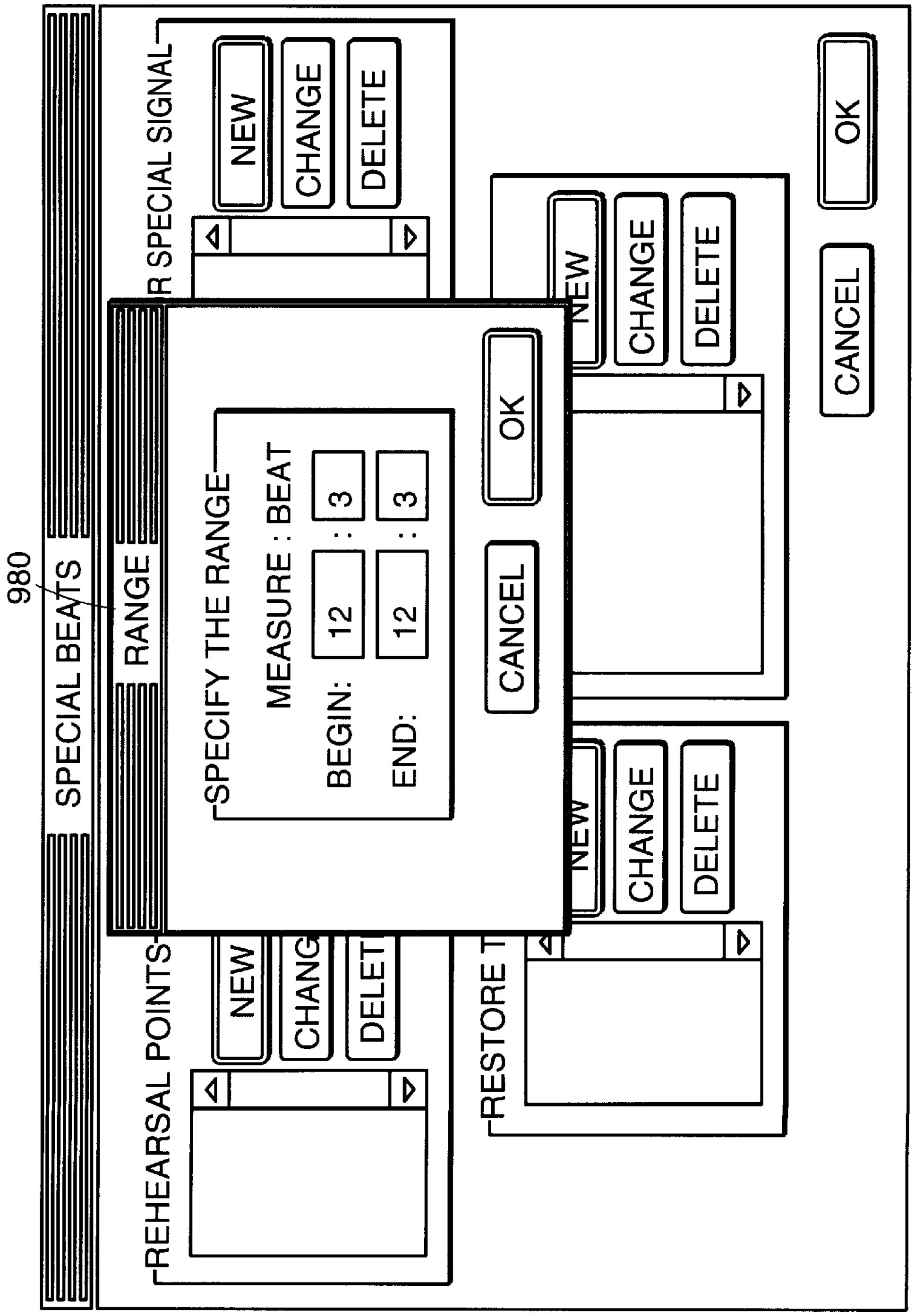
FIG. 16A is a screen display of the Range dialog box.

FIG. 16 shows an embodiment of a Special Beats dialog box 960. The Special Beats dialog box 960 can be displayed by selecting the Special Beats command from the Settings menu 790. The Special Beats dialog box 960 allows certain positions in the accompaniment score to be identified for special behavior by the apparatus. Using the Special Beats dialog box 960, a user of the apparatus may specify one or more rehearsal points using the Rehearsal Points entry field 962. Identification of one or more rehearsal points allows the user to easily jump to a particular point of the accompaniment score, facilitating practice of a musical piece. When one or more rehearsal points are set, the user may jump forward or back to a rehearsal point using the forward control 634 and reverse control 648 of the screen display 600. Alternatively, the user may jump forward using the Jump Ahead command 770 on the Controls menu 758. Similarly, using the Wait For Soloist 964 entry field, a user may specify one or more measures and beats at which the apparatus will wait for the exact notes that match the score at that point before following the performance. The user may also specify one or more measures and beats at which the apparatus should stop rendering the accompaniment score while it waits for a special signal from the user using the Wait For Special Signal 966 entry area. The Restored Tempo entry area 968 allows a user to specify one or more measures and beats which will cause the apparatus to change the tempo of playback to conform to the tempo specified in the score. The Ignore Soloist entry field 970 allows a range of measures and beats to be specified. For the range of measures and beats specified, the apparatus will ignore soloist input. In FIG. 16A, an embodiment of a Range dialog box 980 is displayed. The Range Dialog box provides the user with a way of entering measure and beat ranges, and can be displayed by clicking the "New" button associated with the Ignore soloist entry area 970.

Figure 17:
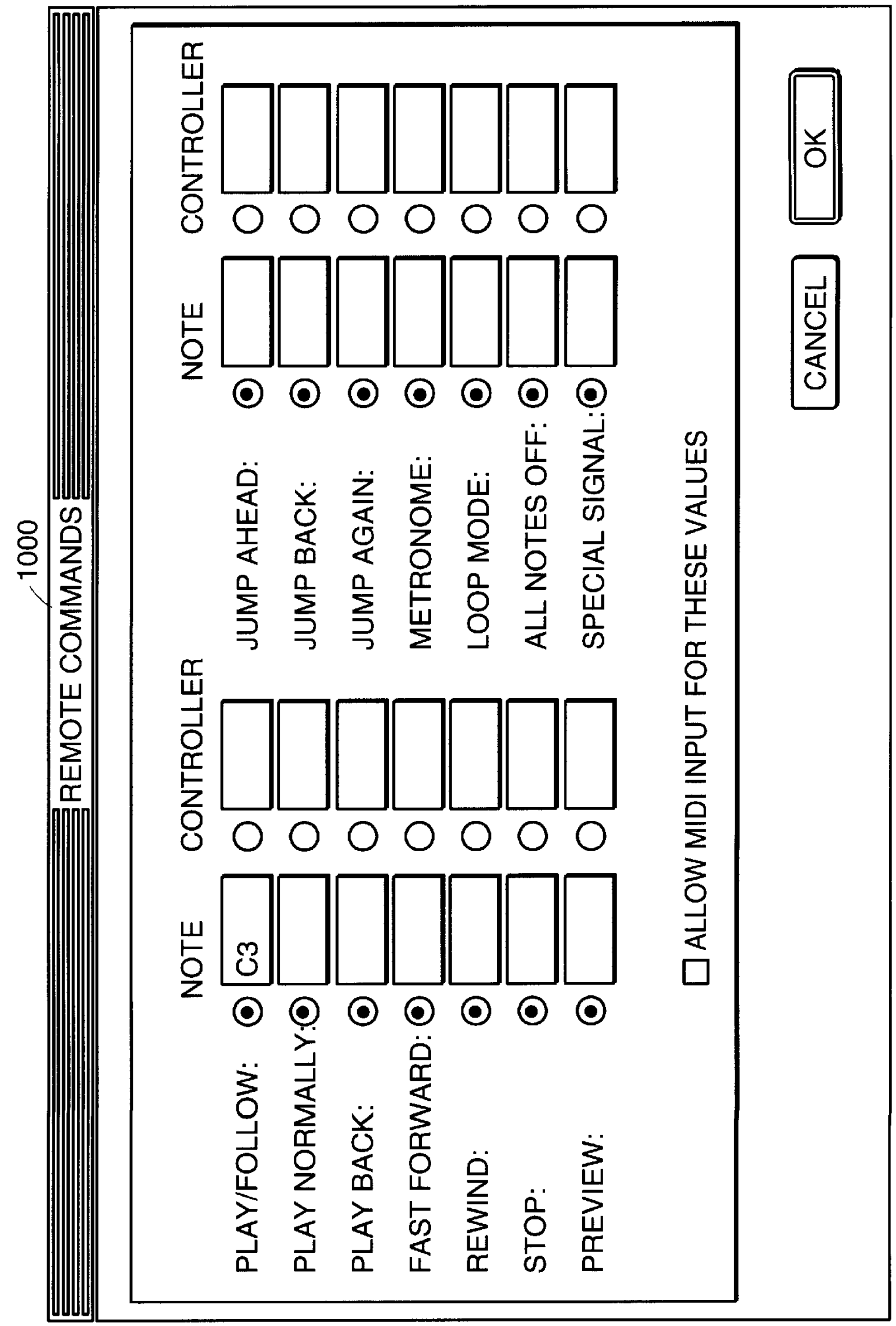
FIG. 17 is a screen display of an embodiment of the apparatus showing the Remote Commands dialog box.

Referring now to FIG. 17, the Remote Commands dialog box 1000 is shown. The Remote Commands dialog box can be displayed by selecting the Remote Control command from the Settings menu 790. The Remote Commands dialog box 1000 allows a user to specify a note or controller to be associated with one of a number of commands. When that note or controller is encountered by the apparatus in the stream of performance input events, the remote command associated with that note or controller is executed. Notes may be entered in any of a number of ways; FIG. 17 displays an embodiment in which note information is input as a MIDI code.

Figure 18:
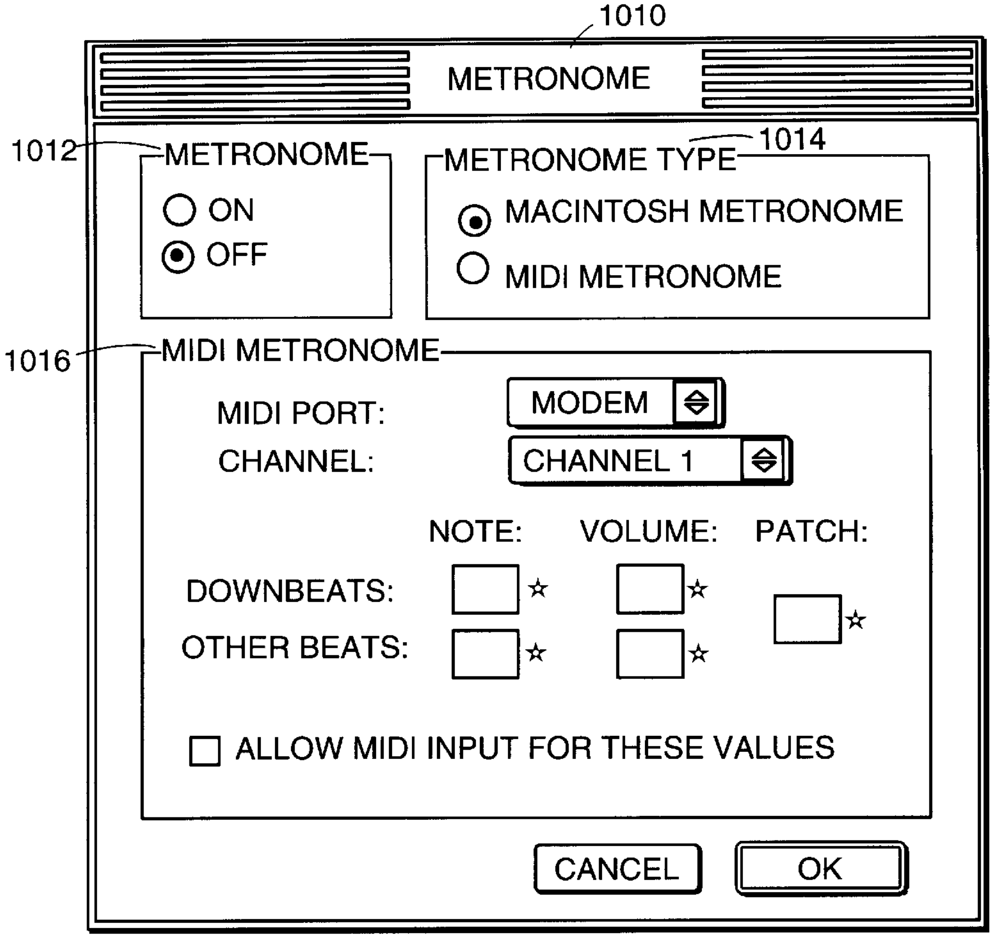
FIG. 18 is a screen display of an embodiment of the apparatus showing the Metronome dialog box.

Referring now to FIG. 18, the Metronome dialog box 1010 is displayed. The Metronome dialog box can be displayed by selecting the Metronome command from the Settings menu 790 or by double-clicking the Current Tempo indicator 606. In some embodiments, the Current Tempo indicator 606 may include a metronome button which can be clicked to display the Metronome dialog box 1010. The Metronome dialog box 1010 provides three categories of information input: Metronome 1012; Metronome Type 1014; and MIDI metronome 1016. The Metronome 1012 radio buttons allow the metronome to be turned on or off. If the "on" radio button is selected, the metronome will sound during playback. The metronome will follow the performance input, just as the provided accompaniment will follow the performance input. This allows the apparatus to provide a metronome which varies its speed in relation to the speed of the performance provided by the musician. The Metronome Type 1014 radio buttons allow a selection to be made between an internal metronome and an external metronome. The embodiment shown in FIG. 18, the choice is between a Macintosh Metronome (internal) and a MIDI Metronome (external). The MIDI Metronome entry area 1016 allows the user to configure how the apparatus interacts with an external metronome, if that choice is selected in the Metronome Type radio buttons 1014. The MIDI Metronome entry area 1016 allows a user to configure which port the external metronome uses, which channel the metronome uses, a note that the metronome uses to sound downbeats or other beats, at what volume the metronome sounds, and whether MIDI Input can be used for the beat note and volume information. In effect, this allows the apparatus to provide a metronome which can signal the first beat of a measure whenever the soloist performance reaches that location in the score, allowing auditory tempo feedback to be given to the performer in much the same way as a live drummer would give such auditory feedback.

Figure 19:
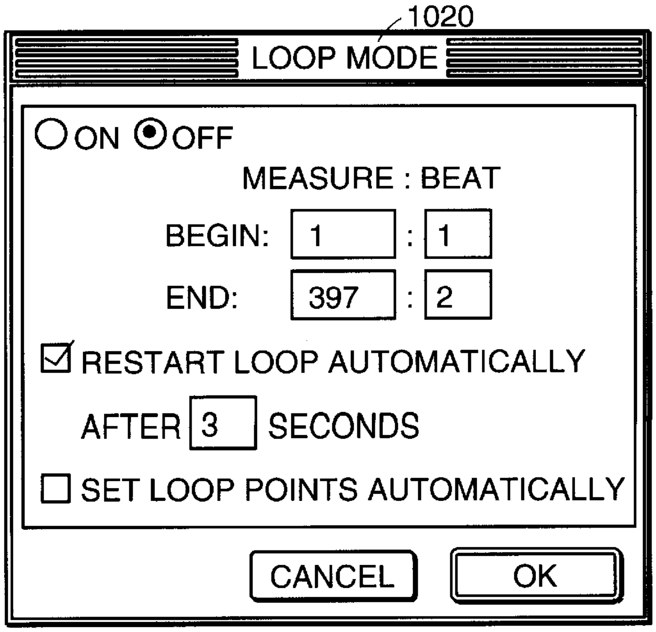
FIG. 19 is a screen display of an embodiment of the apparatus showing the Loop Mode dialog box.

Referring now to FIG. 19, the Loop Mode dialog box 1020 is displayed. The Loop Mode dialog box can be displayed by selecting the Loop Mode command from the Settings menu 790 or by double-clicking on or near the looping controls 628, 630, 632, 634, 636, 638, 648, 650. The Loop Mode may be turned on or off by selecting the appropriate radio button, and the beginning and end points of the loop are specified in the beginning measure, beginning beat, ending measure, and ending beat text entry fields. Entry of data in those fields is similar to entering loop data in the data in the start loop indicator 648 and the end loop indicator 650 displayed on the main screen display 600. The Restart Loop Automatically check box allows the apparatus to be configured to continually loop the score beginning at the beginning measure and beginning beat and ending at the ending measure and ending beat. The apparatus may also be configured to pause before restarting the loop. The Loop Mode dialog box 1020 may also include a Set Loop Points Automatically check box. If this check box is selected, a beginning loop point is set when the apparatus begins playback and an end loop point is set when playback is stopped. This can be effected by storing the measure and beat when playback is initiated and ended in data structures representing the beginning measure, beginning beat, ending measure, and ending beat.

Figure 20:
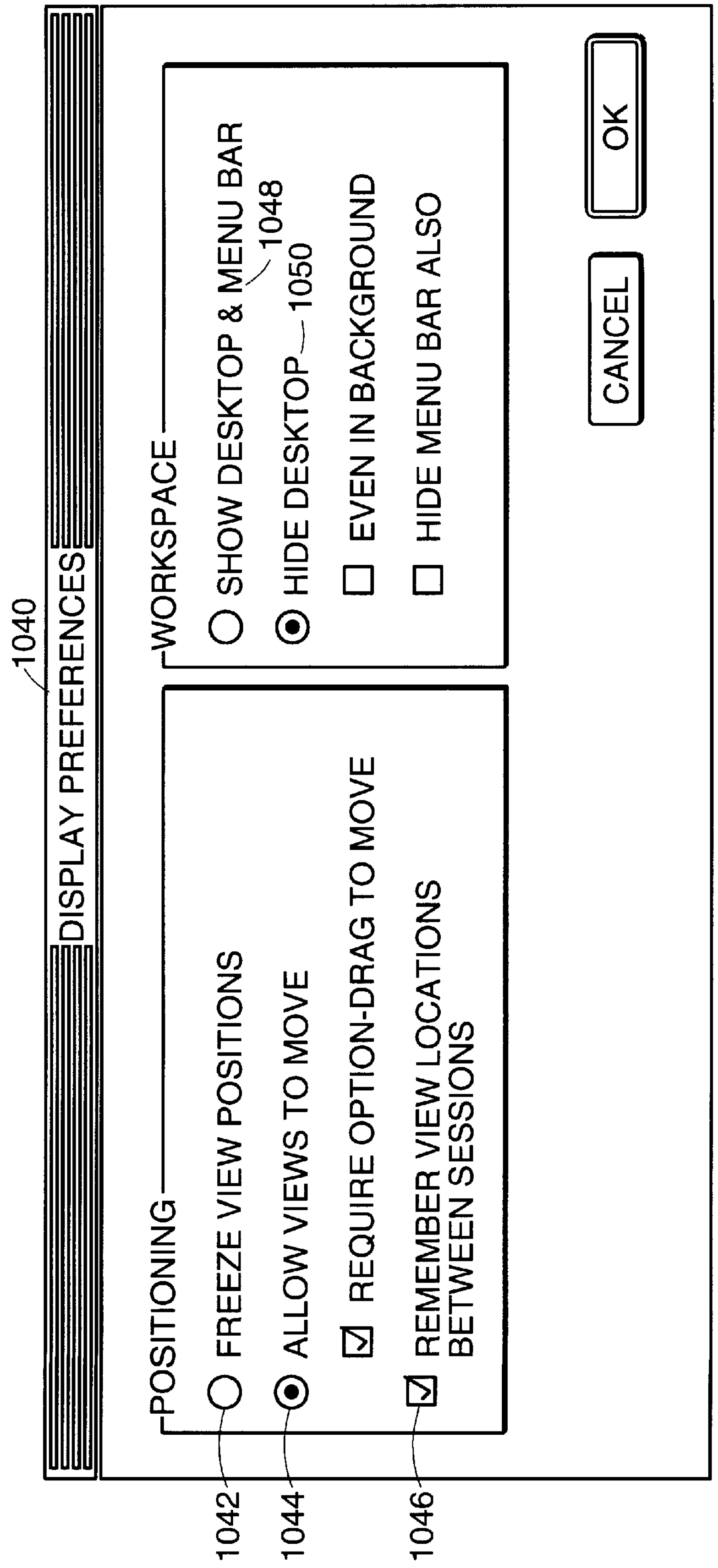
FIG. 20 is a screen display of an embodiment of the present invention showing the Display Preferences dialog box.

Referring now to FIG. 20, the Display Preferences dialog box 1040 is shown. The Display Preferences dialog box 1040 can be displayed by selecting the Display Preferences command on the Settings menu 790. The Display Preferences dialog box 1040 includes a number of settings for positioning screen display 600 elements, including the Freeze View Positions radio button 1042, the Allow Views To Move radio button 1044, and the Remember View Locations Between Sessions check box 1046. If the Freeze View Positions Radio Button 1042 is selected, then the indicators on the main screen display 600 are not moveable. If the Allow Views To Move Radio Button 1044 is selected, then the indicators may be moved around. Additionally, the user may require a modifier key to be pressed in order to allow the views to move. In the embodiment shown in FIG. 20, the user has required the option key to be pressed in order to allow the views to move. If the Remember View Locations Between Sessions check box is checked, the apparatus will remember the configuration of the screen display 600 elements for a particular piece and will that configuration when the piece is loaded from its file. The Display Preferences dialog box 1040 also allows the user to configure the work space, and it includes a Show Desktop And Menu Bar radio button 1048 and a Hide Desktop radio button 1050. The Show Desktop And Menu Bar radio button 1048 allows the desktop and menu bar of the user's general-purpose computer to be displayed while the apparatus is running. The Hide Desktop radio button 1050 hides the desktop from view while the apparatus is running.

Figure 21:
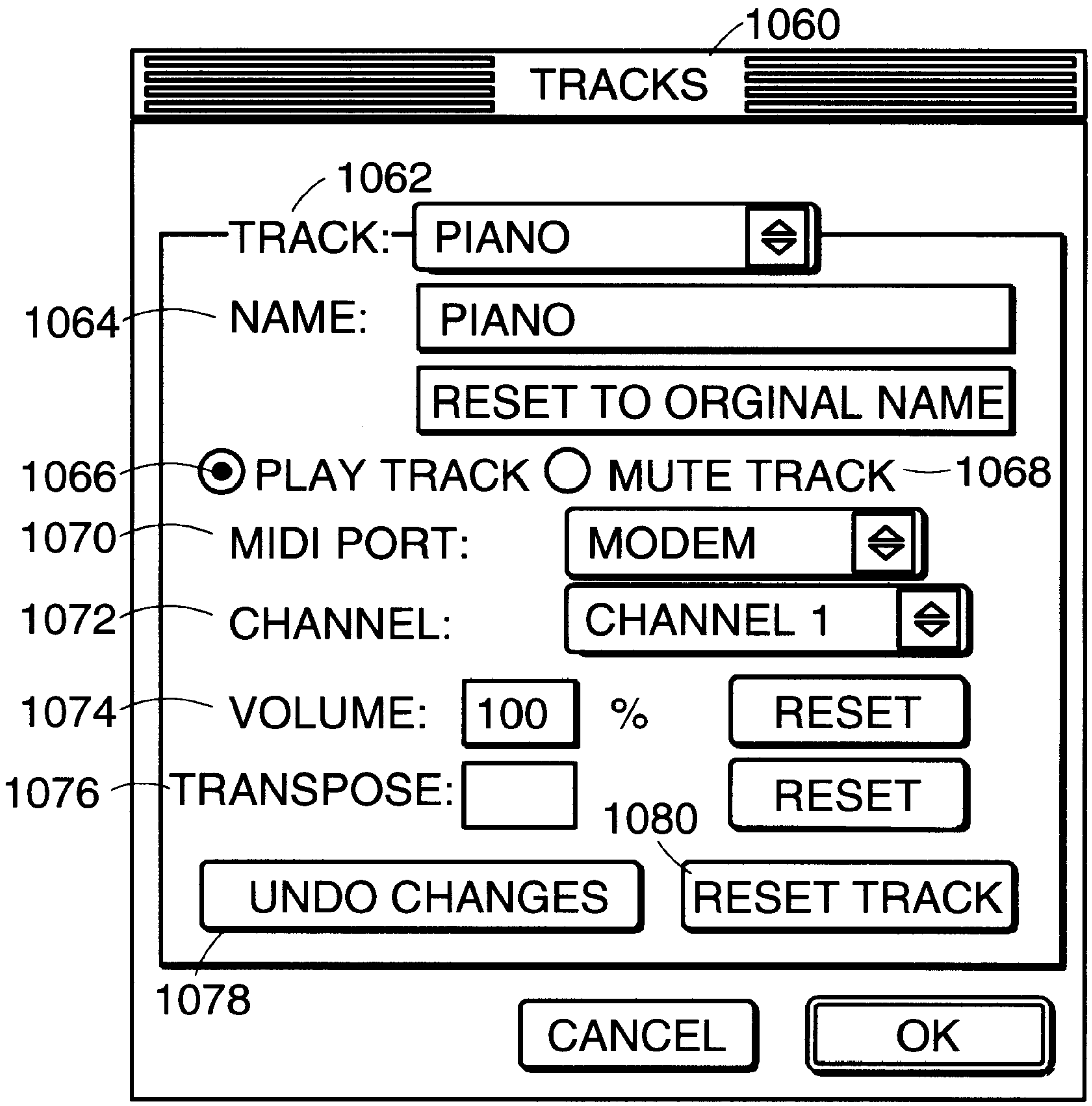
FIG. 21 is a screen display of an embodiment of the present invention showing the Tracks dialog box.

Referring now to FIG. 21, the Tracks dialog box 1060 is shown. The Tracks dialog box can be displayed by selecting the Track Settings command from the Settings menu 790 or by double-clicking on the MIDI track display 612 on the screen display 600. The Tracks dialog box 1060 allows the user to configure individual MIDI tracks by selecting them from the Track pop-up menu 1062. In the embodiment shown in FIG. 21, the piano track is selected for configuration. A name may be entered in the name field 1064. Then name entered in this field is the name displayed by the MIDI track display 612 on the screen display 600. The user may select either the Play Track radio button 1066 or the Mute Track radio button 1068. If the Play Track radio button 1066 is selected, the track will be included in the accompaniment score, unless the apparatus is following a soloist and the track is identified as the solo track. The play indicator 654 of the MIDI track display 612 will be displayed on the screen display 600. Similarly, if the Mute Track radio button 1068 is selected, the MIDI track will not be included in the accompaniment score and the play indicator 654 will indicate that the track is not included when the score is played back. The Tracks dialog box 1060 also includes a MIDI port pop-up menu 1070 and a Channel pop-up menu 1072. The MIDI port pop-up menu 1070 allows selection of the MIDI port that will be used to play the track. The Channel pop-up menu allows selection of the MIDI channel associated with the track. The Tracks dialog box 1060 also includes a Volume Entry field 1074 and a Transpose Entry field 1076. Alphanumeric data may be entered into each of these fields in order to control the volume of the track and the number of half steps that track is transposed. Entry of a number other than 100 percent in the Volume Entry field 1074 is equivalent to pushing or pulling the slider control 660 associated with the channel in the MIDI track display 612 on the screen display 600. Similarly, entry of data in the Transpose entry field 1076 causes the transposition indicator 658 in the MIDI track display 612 of the screen display 600 to display transposition information. In the embodiment shown in FIG. 21, the Tracks dialog box 1060 includes an Undue Changes button 1078 and the Undue Changes button 1078 clears any changes made to the Tracks dialog box 1060 since it has been opened. The Reset Track button 1080 resets the indicated track to the default settings, which may be stored in the file associated with the accompaniment score.

Figure 22:
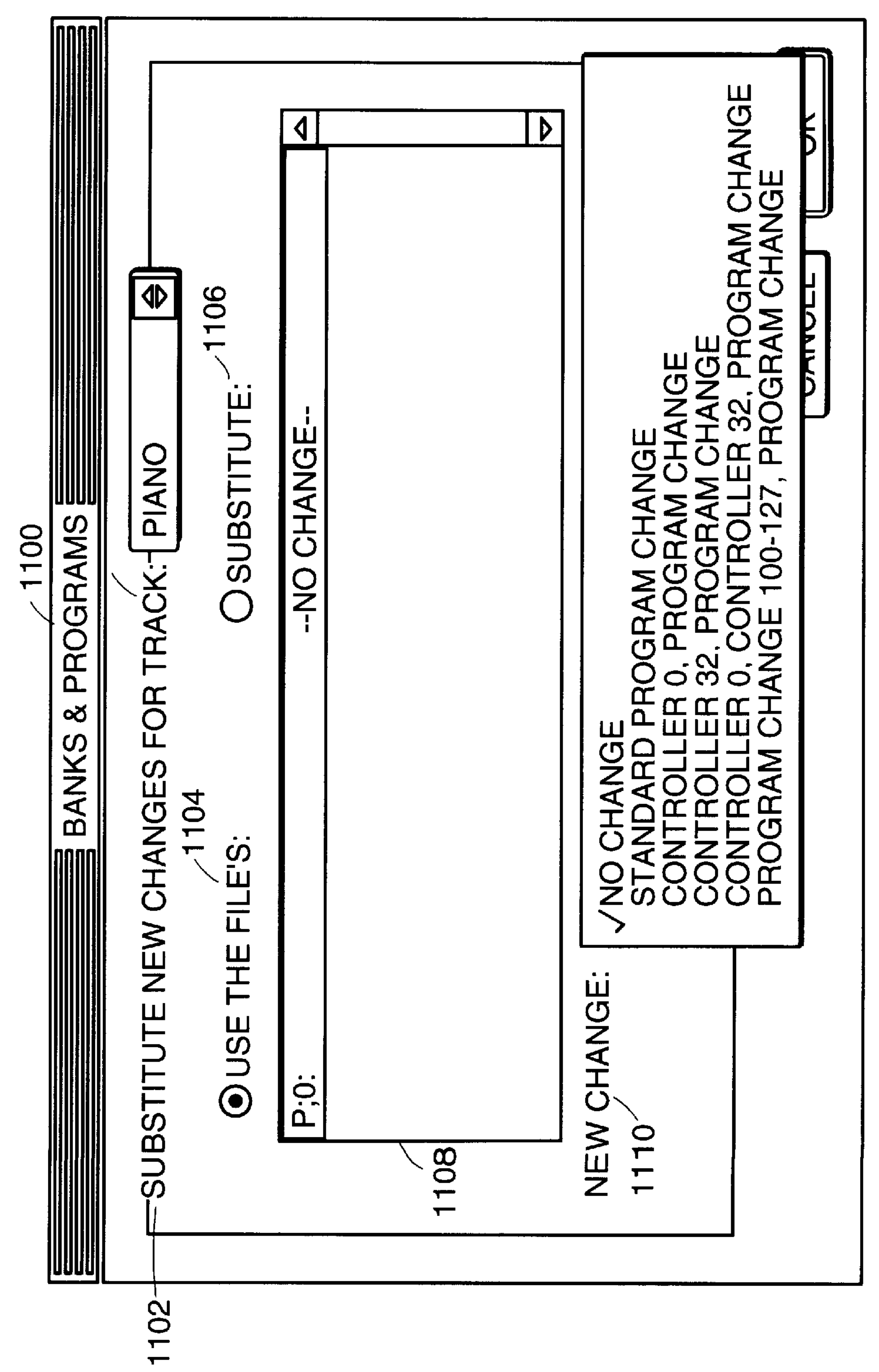
FIG. 22 is a screen display of an embodiment of the apparatus showing the Banks & Programs dialog box.

Referring now to FIG. 22, the Banks & Programs dialog box 1100 is shown. The Banks & Programs dialog box may be displayed by selecting the Bank & Programs command from the Settings menu 790. The Banks & Programs dialog box allows alternative sounds to be defined for each track in the file associated with the accompaniment score. A track may be selected using the Substitute New Changes For Track: pop-up menu 1102. The Use The File's: radio button instructs the apparatus to use any programs or voices identified by the original file without changing them. If the Substitute: radio button 1106 is selected, the apparatus will substitute the programs and voices identified in the Changes display box 1108 below the radio button. A new change is entered using the New Change: pop-up menu. In the embodiment shown in FIG. 22, a user of the apparatus may select from: No Change; Standard Program Change; Controller 0, Program Change; Controller 32, Program Change; Controller 0, Controller 32, Program Change; and Program Change 100-127, Program Change. If No Change is selected, then no substitutions will be entered in the changes dialog box 1108. If Standard Program Change is selected, the apparatus will prompt the user to enter a new program number. If Controller 0, Program Change is selected, the apparatus will prompt the user to enter a new bank selection number and a program number. If Controller 32, Program Change is selected, the apparatus will prompt the user for a new bank selection number and a program number. If Controller 0, Controller 32, Program Change is selected, the apparatus will prompt the user to enter a new bank selection number, and a program number. If Program Change 100-127, Program Change is selected, the apparatus will prompt the user to enter a new bank selection number and a program number.

Figure 23:
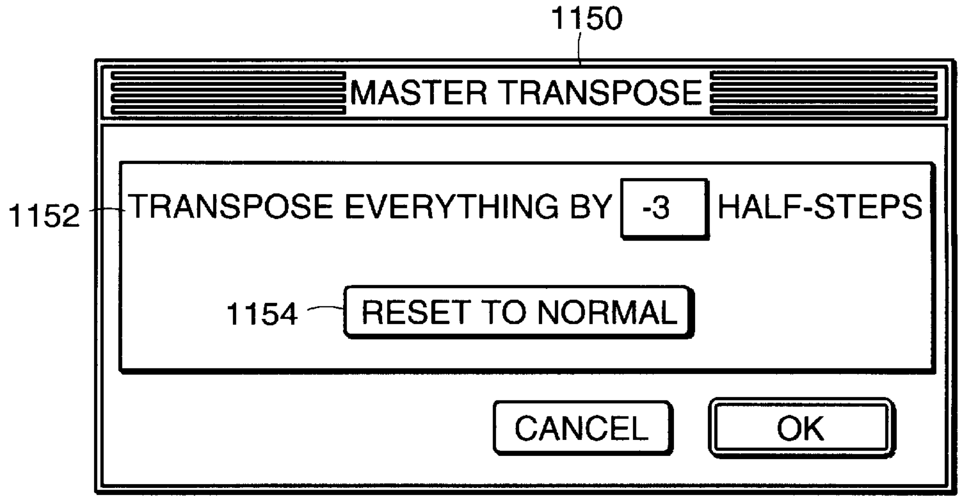
FIG. 23 is a screen display of an embodiment of the apparatus showing the Master Transpose dialog box.

Referring now to FIG. 23, the Master Transpose dialog box 1150 is shown. The Master Transpose dialog box can be displayed by selecting the Master Transpose command from the Settings menu 790. The Master Transpose dialog box 1150 includes a transposition entry box 1152 which allows the user to specify a number of musical half steps that transpose the playback by the apparatus. Transpositions to higher keys are entered as positive numbers and transpositions to lower keys are entered as negative numbers. The Master Transpose dialog box 1150 also includes a Reset To Normal Button 1154 which resets the number of half steps the apparatus transposes the playback of the accompaniment to the setting contained in the file associated with the score.

Figure 24:
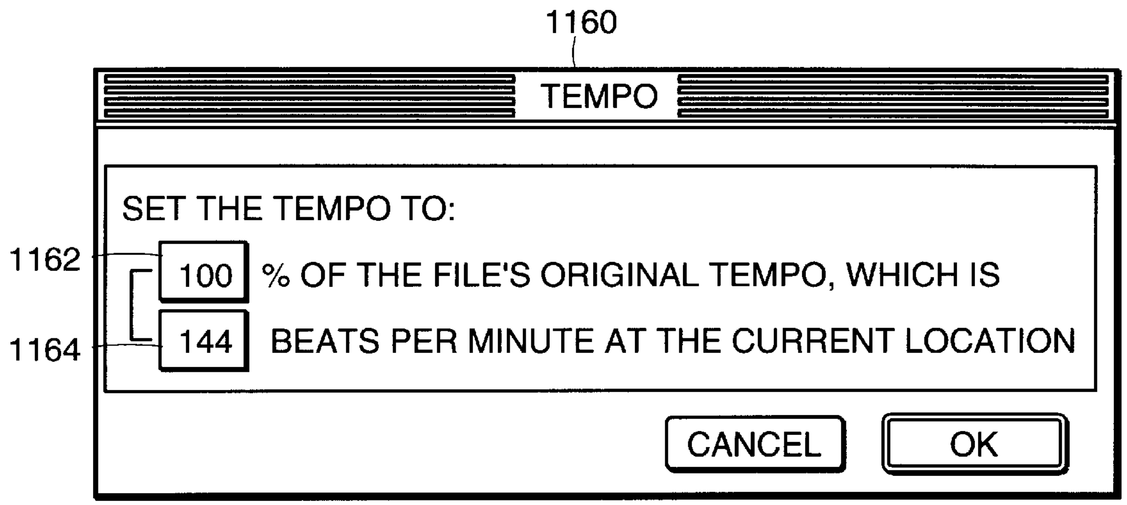
FIG. 24 is a screen display of an embodiment of the apparatus showing the Tempo dialog box.

Referring now to FIG. 24, the Tempo dialog box 1160 is displayed. The Tempo dialog box can be displayed by selecting the Tempo command from the Settings menu 790.

The Tempo dialog box 1160 includes a pair of related entry fields 1162 and 1164. The Percentage entry field 1162 allows the user to specify a percentage of the file's original tempo at which the apparatus plays back a score. The Absolute entry field 1164 allows the user to specify the number of beats per minute at which the accompaniment is to be played back. When data is centered in the Absolute entry field, the Percentage entry field changes to reflect the new percentage change from the tempo specified in the accompaniment file.

A general-purpose computer programmed appropriately in software may be programmed in any one of a number of languages including PASCAL, C, C++, BASIC, or assembly language. The only requirements are that the software language selected provide appropriate variable types to maintain the variables described above and that the code is able to run quickly enough to perform the actions described above in real-time.

While the invention has been particularly shown and described with reference to specific preferred embodiments, it should be understood by those skilled in the art that various changes in form and detail may be made without departing from the spirit and scope of the invention as defined by the appended claims.

What is claimed is:

1. A method for real-time tracking of a musical performance in relation to a score of the performed piece, the method comprising the steps of:

(a) receiving each note of the musical performance as it occurs;

(b) determining, for each received note, a range of the score in which the note is expected to occur;

(c) determining, for each received note, if the received note occurs in the determined range of the score;

(d) providing a coordinated accompaniment if the received note occurs in the determined range of the score; and (e) displaying information associated with a real-time analysis of the performance.

2. The method of claim 1 wherein step (e) comprises displaying information relating to the volume of the performance.

3. The method of claim 1 wherein step (e) comprises displaying information relating to the tempo of the performance.

4. The method of claim 1 wherein step (e) comprises displaying information indicating the measure and beat of the score at which performance input is received.

5. The method of claim 1 wherein step (e) comprises displaying information indicative of receipt of incorrect notes in the musical performance.

6. The method of claim 1 wherein step (e) comprises displaying information indicative of receipt of incorrectly timed notes in the musical performance.

7. The method of claim 1 wherein step (e) comprises outputting musical information.

* * * * *